(12) United States Patent
Kikuchi et al.

(10) Patent No.: US 6,680,094 B2
(45) Date of Patent: Jan. 20, 2004

(54) PACKAGING MATERIAL AND MULTI-LAYER CONTAINER

(75) Inventors: Atsushi Kikuchi, Yokohama (JP); Ikuo Komatsu, Yokohama (JP); Toshiki Yamada, Yokohama (JP); Yoshihiro Kitano, Yokohama (JP); Go Saito, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 10/003,055

(22) Filed: Dec. 6, 2001

(65) Prior Publication Data
US 2002/0146527 A1 Oct. 10, 2002

(30) Foreign Application Priority Data
Dec. 8, 2000 (JP) ........................................ 2000-374947
Apr. 26, 2001 (JP) ........................................ 2001-130170

(51) Int. Cl.$^7$ ........................... C08K 5/098; C08L 77/00
(52) U.S. Cl. .................. 428/36.6; 428/36.8; 428/475.5; 428/480; 428/475.2
(58) Field of Search ............................... 428/36.6, 36.8, 428/475.5, 480

(56) References Cited

U.S. PATENT DOCUMENTS

| | | | | |
|---|---|---|---|---|
| 5,211,875 A | * | 5/1993 | Speer et al. | ........... 252/188.28 |
| 6,239,210 B1 | * | 5/2001 | Kim et al. | ................... 524/538 |
| 6,423,776 B1 | * | 7/2002 | Akkapeddi et al. | ........... 525/66 |

* cited by examiner

*Primary Examiner*—Sandra M. Nolan
(74) *Attorney, Agent, or Firm*—Sughrue Mion, PLLC

(57) ABSTRACT

A packaging material having an oxygen-absorbing layer of a thermoplastic resin which is blended with an organic oxidizing component and with a transition metal catalyst, wherein the thermoplastic resin is not substantially oxidized in the presence of the transition metal catalyst. The thermoplastic resin is not deteriorated by oxidation and, hence, oxygen-barrier property is not deteriorated, making it possible to stably suppress the permeation of oxygen over extended periods of time.

12 Claims, 4 Drawing Sheets

PACKAGING MATERIAL AND MULTI-LAYER CONTAINER

BACKGROUND OF THE INVENTION

1. Field of the Invention

The present invention relates to a packaging material and, more specifically, to a packaging material such as a closure and a container like bottles and cups, which are capable of stably suppressing the permeation of oxygen through the container walls for extended periods of time.

2. Prior Art

As packaging containers, there have heretofore been used metal cans, glass bottles and a variety of plastic containers accompanied, however, by problems of disintegration of the contents and loss of flavor due to oxygen remaining in the containers and due to oxygen that enters permeating through the container walls.

In the case of the metal cans and glass bottles, quite no oxygen enters permeating through the containers walls, and only oxygen remaining in the containers could cause a problem. In the case of the plastic containers, however, oxygen enters permeating through the container walls to a degree that is no longer negligible arousing a problem from the standpoint of preserving the contents.

In order to prevent this, the plastic containers have been produced having container walls of a multi-layer structure containing at least a layer of a resin having oxygen-blocking property, such as an ethylene/vinyl alcohol copolymer.

A deoxidizing agent has long been used for removing oxygen in the containers. Japanese Examined Patent Publication (Kokoku) No. 1824/1987 discloses an invention using the deoxidizing agent for the container walls, according to which a multi-layer structure for packaging comprises, laminated one upon the other, a layer blended with the deoxidizing agent containing, as a chief agent, a reducing material such as iron powder or the like in the resin having oxygen-permeating property, and a layer having an oxygen gas shut-off property.

Japanese Examined Patent Publication (Kokoku) No. 60826/1992 proposed by the present inventors discloses a multi-layer packaging material comprising a laminated structure of:

- an intermediate layer of a resin composition of a gas-barrier thermoplastic resin having an oxygen permeation coefficient at 20° C. and 0% RH of not larger than $10^{-12}$ cc·cm/cm²·sec·cmHg and a water-absorbing amount at 20° C. and 100% RH of not smaller than 0.5% blended with an organometal complex of a transition metal; and
- layers of a moisture-resistant thermoplastic resin formed on both sides of the intermediate layer.

Japanese Patent No. 2,991,437 teaches a barrier wall for packaging including a composition of a polymer having oxygen-trapping property or including a layer of this composition, wherein the composition traps oxygen as an organic oxidizing component is oxidized with a metallic catalyst, the organic component that can be oxidized being a polyamide and, particularly, a polyamide containing a xylylene group.

It has long been known to use the xylylene-containing polyamide as a gas-barrier resin layer in the multi-layer container, and to blend a thermoplastic resin with a deoxidizing agent to absorb oxygen that enters permeating through the container wall (e.g., see Japanese Examined Patent Publication (Kokoku) No. 1824/1987, Japanese Unexamined Patent Publication (Kokai) No. 278344/1989, International Patent Publication No. 500846/1990).

A method of blending a resin with an oxygen-absorbing agent such as an iron powder to use it as a wall of the packaging material is satisfactory from the standpoint of large oxygen-absorbing ability but cannot be used in the field of packages where transparency is required since it causes the resin to be tinted in a specific hue.

On the other hand, an oxygen-absorbing resin composition containing a catalyst of the type of a transition metal is advantageous since it can be used even for the packaging containers that are substantially transparent accompanied, however, by such a defect that a base resin blended with the catalyst of the type of a transition metal is deteriorated upon the oxidation permitting the permeation of oxygen through the container wall to increase with the passage of time and, further, causing the strength of the container to decrease.

SUMMARY OF THE INVENTION

The present inventors have discovered the fact that in a multi-layer packaging material provided with an oxygen-absorbing layer of a thermoplastic resin blended with an oxidizing polymer and a transition metal catalyst, oxygen is selectively absorbed due to the oxidation of the oxidizing polymer and, as a result, the above-mentioned defect is effectively overcome.

Namely, it is an object of the present invention to provide a multi-layer packaging material which has excellent oxygen-absorbing property and is capable of suppressing the permeation of oxygen through the oxygen-absorbing layer for extended periods of time.

Another object of the present invention is to provide a multi-layer packaging material provided with an oxygen-absorbing layer of the type of separated functions, the oxygen-absorbing layer having excellent oxygen-absorbing property and further having excellent oxygen-barrier property.

A further object of the present invention is to provide a multi-layer container made of the above packaging material, exhibiting excellent oxygen-absorbing property and excellent oxygen-barrier property, and withstanding hot filling and preservation over extended periods of time.

According to the present invention, there is provided a packaging material having an oxygen-absorbing layer of a thermoplastic resin which is blended with an organic oxidizing component and with a transition metal catalyst, wherein the thermoplastic resin is not substantially oxidized in the presence of the transition metal catalyst.

In the packaging material of the present invention, it is desired that the thermoplastic resin is a xylylene group-containing polyamide resin having a amino end group (AEG) concentration of not smaller than 40 eq/$10^6$ g.

It is further desired that the above-mentioned organic oxidizing component is a polyene and, particularly, a polyene having a functional group on a side chain or at a terminal thereof. In particular, the organic oxidizing component is a polybutadiene or a polyisoprene modified with maleic acid or an anhydride thereof. It is further desired that the organic oxidizing component is dispersed in the thermoplastic resin, and the dispersant has a minimum length of not larger than 400 nm.

Further, it is desired that the above-mentioned transition metal catalyst is an organic salt of cobalt and is contained at a concentration of not smaller than 300 ppm calculated as a metal. It is desired that the packaging material is in the form of a multi-layer container having at least one oxygen-absorbing layer.

In the multi-layer container of the present invention, it is desired that the thermoplastic resin in the oxygen-absorbing layer is a xylylene group-containing polyamide resin having a amino end group concentration of not smaller than 40 eq/$10^6$ g, and, particularly, that an exothermic peak of the xylylene group-containing polyamide resin due to the crystallization is not larger than 10 J/g as measured by the DSC, and a half-value width of a maximum value of a diffraction profile at 2 θ=0 to 100° is not larger than 10° as measured relying upon the X-ray diffraction.

It is further desired that a layer of a thermoplastic polyester resin is provided on at least the one side of the oxygen-absorbing layer, that the thermoplastic polyester resin has a crystallinity of from 30 to 55% and that the half-value width of an X-ray diffraction profile thereof is not larger than 15°.

DETAILED DESCRIPTION OF THE INVENTION

The packaging material of the present invention is provided with an oxygen-absorbing layer of a thermoplastic resin as a base material which is blended with an organic oxidizing component and a transition metal catalyst. A feature resides in that the thermoplastic base resin material is not substantially oxidized even in the presence of the transition metal catalyst. Therefore, the oxygen-absorbing property is exhibited without permitting the thermoplastic base resin material to be deteriorated by oxidation.

In the known oxygen-absorbing resin composition comprising a resin and a transition metal catalyst, oxygen is absorbed as the resin undergoes the oxidation. Permeation of oxygen through the resin layer tends to increase accompanying the deterioration of the resin due to oxidation.

In the oxygen-absorbing layer used for the packaging material of the present invention, on the other hand, the thermoplastic base resin material is not substantially oxidized; i.e., oxygen is absorbed as the organic oxidizing component is oxidized. Therefore, the oxygen-absorbing property is exhibited without deteriorating the oxygen-barrier property and without decreasing the strength that result as the thermoplastic base resin material is deteriorated by oxidation.

In the present invention, it is desired that the thermoplastic base resin material in the oxygen-absorbing layer has an oxygen-barrier property and an oxygen permeation coefficient of not larger than 7 cc·mm/$m^2$·day·atm (20°, 0% RH). The oxygen barrier resin that is used must not be substantially oxidized in the presence of the transition metal catalyst, as a matter of course.

As the thermoplastic resin that satisfies the above requirement, there can be exemplified an oxygen-barrier resin such as polyamide and, particularly, xylylene group-containing polyamide and copolymerized polyester, or a polyethylene terephthalate or an ethylene/vinyl alcohol copolymer. Among them, according to the present invention, there can be preferably used a xylylene group-containing polyamide resin having an amino end group concentration of not smaller than 40 eq/$10^6$ g and, particularly, not smaller than 50 eq/$10^6$ g.

That is, the polyamide derived from the diamine component comprising chiefly a xylylene diamine and from a dicarboxylic acid component, is desired from the standpoint of oxygen-barrier property. That is, the above-mentioned xylylene group-containing polyamide resin has an advantage of permitting oxygen to permeate through little compared to the wholly aliphatic polyamide resin.

Figure 1:
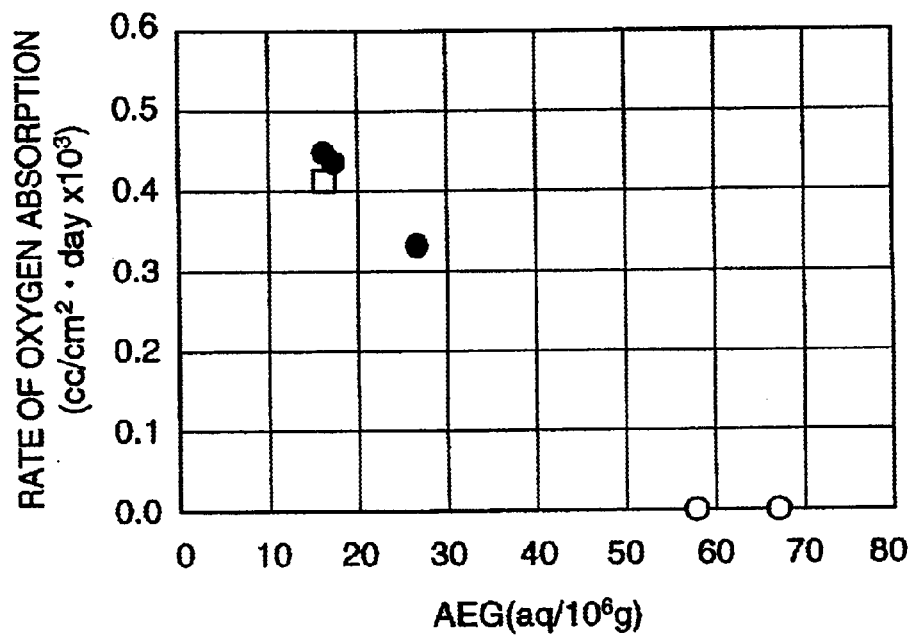
FIG. 1 is a graph illustrating a relationship between the concentration of amino end groups of a metaxylylene polyamide resin and the rate of absorbing oxygen.

FIG. 1 is a graph illustrating a relationship between the concentration of amino end group of a metaxylylene polyamide resin and the rate of absorbing oxygen. The rate of absorbing oxygen was found by forming films of a thickness of 20 μm from the compositions of metaxylylene polyamide resins having different amino end group concentrations and blended with a cobalt neodecanoate in an amount of 400 ppm calculated as cobalt, tempering the films at 22° C. and 60%RH, introducing the films into a container of Hiretoflex to preserve them therein for 7 days, and measuring the oxygen concentrations by using a gas chromatography. The polyamide resin exhibits a large rate of oxygen absorption and its deterioration due to oxydation is promoted in a range where the amino end group concentration of the polyamide resin is from 10 to 30 eq/$10^6$ g. When the amino end group concentration lies in a range of from 50 to 70 eq/$10^6$ g, on the other hand, the rate of oxygen absorption of the polyamide resin is 0; i.e., the polyamide resin is not at all deteriorated by oxidation.

According to the study conducted by the present inventors, it was discovered that there exists an intimate relationship between the deterioration of the polyamide resin due to oxidation, i.e., the absorption of oxygen and the concentration of the amino end groups of the polyamide resin. That is, when the amino end group concentration of the polyamide resin lies in the above-mentioned relatively large range, the rate of oxygen absorption is suppressed to be almost zero or to be close to zero. When the amino end group concentration of the polyamide resin becomes smaller than the above-mentioned range, on the other hand, the polyamide resin absorbs oxygen at an increased rate.

As will be demonstrated later in Examples, a relationship between the passage of time and the amount of oxygen permeation was examined concerning a composition obtained by blending a metaxylylene polyamide resin having a amino end group (AEG) concentration of 27 eq/$10^6$ with a cobalt catalyst in an amount of 400 ppm and a composition obtained by blending a metaxylylene polyamide resin having a amino end group (AEG) concentration of 87 eq/$10^6$ with an organic oxidizing component (acid-modified diene polymer) in an amount of 5% by weight and a cobalt catalyst in an amount of 400 ppm. After 30 days have passed, the amount of oxygen permeation was 0.31 cc/cup in the case of the former resin composition and 0.01 cc/cup in the case of the latter composition. Thus, the packaging material of the present invention suppresses the permeation of oxygen through the container wall to a striking degree even after the passage of long periods of time.

It is considered that the effect of the present invention is stemming from the function of maintaining the oxygen-barrier property by the thermoplastic resin material and the function of absorbing oxygen by the organic oxidizing component, that are separately exhibited.

The organic oxidizing component used in the present invention absorbs oxygen upon reacting with oxygen in the presence of a transition metal catalyst. It is desired that the organic oxidizing component is a polyene and, particularly, a polyene having a functional group on a side chain or at a terminal from the standpoint of dispersion in the thermoplastic resin and absorption of oxygen.

It is desired that the organic oxidizing component used in the present invention is a polymer derived from polyenes and, particularly, a polyene polymer modified with an acid or an acid anhydride (hereinafter simply referred to as modified with an acid).

The polymer derived from the polyenes has double bonds in the main chain or in the side chain of the polymer. According to Smith's theory, carbon atoms neighboring the double bond tend to be very activated and easily release hydrogen gas.

In the polymer derived from the polyene, hydrogen atoms are easily pulled out at positions of carbon atoms neighboring the carbon—carbon double bond in the polymer thereby to generate a radical. The composition containing the transition metal catalyst and the above organic oxidizing component absorbs oxygen through the oxidation of the organic component, as a matter of course. Here, it is believed that the oxidation takes place through the elementary processes of ① generation of radicals due to the pull-out of hydrogen atoms from the carbon atoms neighboring the double bond by the transition metal catalyst, ② generation of peroxy radicals due to the addition of oxygen molecules to the radicals, and ③ pull-out of hydrogen atoms by peroxy radicals.

When the transition metal catalyst is present in small amounts without causing the resin to be deteriorated even under normal condition, however, there exists an induction period for generating the radicals and for adding oxygen, from which it is considered that these elementary processes are not necessarily taking place quickly and effectively.

On the other hand, the acid-modified polyene polymer favorably used in the present invention has functional groups such as a carboxylic acid group and a carboxylic anhydride group in addition to the above-mentioned carbon atoms neighboring the double bond, and is believed to be effective in shortening the induction period.

That is, the above functional groups are all electron-attracting groups that activate the carbon atoms neighboring the double bond.

Besides, when the thermoplastic resin is blended with the acid-modified polyene polymer, the acid-modified polyene polymer is favorably dispersed in the thermoplastic resin matrix making it possible to favorably work the resin composition, which is very desirable.

In the case of the unmodified polyene polymer, the polyene polymer is dispersed relying upon a simple mechanical kneading. Therefore, the dispersion is poor, the degree of dispersion is irregular, and the workability of the resin composition is inferior.

On the other hand, the acid-modified polyene polymer exhibits improved affinity to the thermoplastic resin such as the polyamide resin due to the presence of the above-mentioned functional groups, and favorably disperses in the thermoplastic resin such as the polyamide resin, enabling the resin composition to be excellently worked.

In the present invention, it is desired that the organic oxidizing component is contained in an amount of from 0.01 to 10% by weight and, particularly, from 1.0 to 7% by weight in the thermoplastic resin.

When the amount of the organic oxidizing component is smaller than the above-mentioned range, the rate of absorbing oxygen becomes considerably smaller than that of when the amount of the organic oxidizing component lies within the above-mentioned range, which is not desirable. When the amount of the organic oxidizing component exceeds the above-mentioned range, on the other hand, no particular advantage is obtained concerning the rate of absorbing oxygen while permeation of oxygen through the layer of the oxygen absorbing resin composition increases and the moldability is deteriorated, which is not desirable, either.

In the oxygen-absorbing layer of the container of the present invention, it is desired that the organic oxidizing component is dispersed in the form of particles or spindle fibers in the thermoplastic resin, the dispersant having a minimum length of not larger than 400 nm, from the standpoint of moldability, dispersion property, oxygen-absorbing property and oxygen-barrier property of the oxygen-absorbing layer. The minimum length of the dispersant stands for a length of a portion where the gap becomes the smallest between two parallel lines between which the dispersant is held in a contacting manner.

Namely, the oxygen-absorbing layer has the dispersion structure in which the thermoplastic resin assumes a continuous phase and the organic oxidizing component assumes a dispersion phase, the particles dispersed in the dispersion phase having diameters lying within the above-mentioned range. Therefore, oxygen is efficiently absorbed by the organic oxidizing component, and the continuous phase of the thermoplastic resin is maintained even after the organic oxidizing component has absorbed oxygen, thus maintaining the oxygen-barrier property.

It is desired that the transition metal catalyst is contained in the oxygen-absorbing layer in an amount of at least 300 ppm. When the amount of the transition metal catalyst is smaller than the above-mentioned range, the rate of absorbing oxygen becomes considerably smaller than when the amount of the transition metal catalyst lies within the above-mentioned range, which is not desirable. When the amount becomes too large, the resin is deteriorated to a conspicuous degree. It is, therefore, desired that the amount is not larger than 800 ppm.

In the present invention, it is desired that the transition metal catalyst is a carboxylate of cobalt from the standpoint of absorbing oxygen. Besides, the catalyst favorably disperses in the resin and does not cause the packaging material to be tinted to an offensive degree.

In the packaging material of the present invention, the oxygen-absorbing layer assumes the above-mentioned composition and dispersion structure. Therefore, the thermoplastic resin in the oxygen-absorbing layer is not substantially deteriorated by oxidation and, hence, the oxygen-absorbing layer after having absorbed oxygen maintains a strength of not smaller than 2.0 kgf/mm².

The packaging material of the present invention can assume any multi-layer structure provided it is equipped with the oxygen-absorbing layer. In general, however, it is desired that the humidity-resistant thermoplastic resin layers are provided on both sides of the oxygen-absorbing layer from the standpoint of suppressing a drop in the oxygen-barrier property in the oxygen-absorbing layer. In general, a thermoplastic resin having excellent oxygen-barrier property is susceptible to the humidity and tends to decrease its oxygen-barrier property upon absorbing humidity. By providing the humidity-resistant thermoplastic resin layers on both sides of the oxygen-absorbing layer, however, this tendency can be suppressed.

[Thermoplastic Resin]

A polyamide resin is favorably used as a thermoplastic resin that serves as a base material of the oxygen-absorbing layer.

As the polyamide resin, there can be exemplified (a) an aliphatic, an alicyclic or a semi-aromatic polyamide derived from a dicarboxylic acid component and a diamine component, and (b) a polyamide derived from an aminocarboxylic acid or a lactam thereof, or a copolyamide thereof or a blend thereof.

Examples of the dicarboxylic acid component include aliphatic dicarboxylic acids having 4 to 15 carbon atoms, such as succinic acid, adipic acid, sebacic acid, decanedicarboxylic acid, undecanedicarboxylic acid and dodecanedicarboxylic acid; and aromatic dicarboxylic acids such as terephthalic acid and isophthalic acid.

Examples of the diamine component include straight-chain or branched-chain alkylene diamines having 4 to 25 carbon atoms and, particularly, 6 to 18 carbon atoms, such as 1,6-diaminohexane, 1.8-diaminooctane, 1,10-diaminodecane and 1,12-diaminododecane; alicyclic diamines such as bis(aminomethyl)cyclohexane, bis(4-aminocyclohexyl)methane, 4,4'-diamino-3,3',-dimethyldicyclohexylmethane and, particularly, bis(4-aminocyclohexyl)methane, 1,3-bis(aminocyclohexyl) methane and 1,3-bis(aminomethyl)cyclohexane; and aroaliphatic diamines such as m-xylylene diamine and/or p-xylylene diamine.

Examples of the aminocarboxylic acid component include aliphatic aminocarboxylic acids such as ω-aminocaproic acid, ω-aminooctanoic acid, ω-aminoundecanoic acid and ω-aminododecanoic acid; and aroaliphatic aminocarboxylic acids such as para-aminomethylbenzoic acid and para-aminophenylacetic acid.

Among these polyamides, it is desired to use a xylylene group-containing polyamide to accomplish the object of the present invention. Concretely speaking, it is desired to use homopolymers such as polymetaxylyleneadipamide, polymetaxylylenesebacamide, polymetaxylylene-suberamide, polyparaxylylenepimeramide and polymetaxylyleneazeramide; copolymers such as metaxylylene/paraxylyleneadipamide copolymer, metaxylylene/paraxylylenepimeramide copolymer, metaxylylene/paraxylylenesebacamide copolymer and metaxylylene/paraxylyleneazeramide copolymer; and copolymers of these homopolymers or copolymers with an aliphatic diamine such as hexamethylenediamine, an alicyclic diamine such as piperadine, an aromatic diamine such as para-bis(2-aminoethyl)benzene, an aromatic dicarboxylic acid such as terephthalic acid, a lactam such as ω-caprolactam, an ω-aminocarboxylic acid such as 7-aminoheptanoic acid, or an aromatic aminocarboxylic acid such as para-aminomethylbenzoic acid. Among them, there can be particularly preferably used a diamine component comprising chiefly an m-xylylenediamine and/or a p-xylylenediamine, and a polyamide obtained from an aliphatic dicarboxylic acid and/or an aromatic dicarboxylic acid.

These xylylene group-containing polyamides exhibit superior oxygen-barrier property to those of other polyamide resin, and are desired for accomplishing the object of the present invention.

In the present invention, it is desired that the polyamide resin has a amino end group concentration of not smaller than 40 eq/$10^6$ g and, more preferably, not smaller than 50 eq/$10^6$ g from the standpoint of suppressing the polyamide resin from being deteriorated by oxidation.

There is a close relationship between the deterioration of the polyamide resin by oxidation, i.e., absorption of oxygen and the concentration of amino end groups of the polyamide resin. That is, when the concentration of the amino end groups of the polyamide resin is in the above-mentioned relatively high range, the rate of absorbing oxygen is suppressed to be almost zero or to be close to zero. When the concentration of the amino end groups of the polyamide resin becomes smaller than the above-mentioned range, on the other hand, the polyamide resin tends to exhibit an increased rate of absorbing oxygen.

By using the polyamide resin and the oxidizing polymer in combination in the above-mentioned range, it becomes possible to selectively absorb oxygen by the oxidizing polymer while suppressing the thermoplastic base resin material from being deteriorated by oxidation, which is desirable.

The polyamide resin having the concentration of amino end groups in the above-mentioned range can be selected out of the polyamide resins that have been placed in the market.

It is desired that these polyamide resins have a concentration of 1.0 g/dl in a 98% sulfuric acid and a relative viscosity (ηrel) of from 1.3 to 4.2 and, particularly, from 1.5 to 3.8 as measured at a temperature of from 20° C. from the standpoint of mechanical characteristics of the container and easiness of working.

As other examples of the thermoplastic resin having excellent oxygen barrier property, there can be used a polyethylene terephthalate (PET) and a gas-barrier polyester. A gas-barrier polyester (hereinafter often written as BPR) contains, in a polymer chain, a terephthalic acid component (T) and an isophthalic acid component (I) at a molar ratio of T:I=95:5 to 5:95 and, particularly, 75:25 to 25:75, and contains an ethylene glycol component (E) and a bis(2-hydroxyethoxy)benzene component (BHEB) at a molar ratio of E:BHEB=99.999:0.001 to 2.0:98.0 and, particularly, 99.95:0.05 to 40:60. As the BHEB, there can be preferably used a 1,3-bis(2-hydroxy)benzene.

It is desired that the polyester (BPR), usually, has a molecular weight at least large enough forming a film and has an intrinsic viscosity [η] of from 0.3 to 2.8 dl/g and, particularly, from 0.4 to 1.8 dl/g as measured in a mixture solvent of phenol and tetrachloroethane at a weight ratio of 60:40 at a temperature of 30° C.

[Organic Oxidizing Component]

It is desired that the organic oxidizing component is a polymer derived from a polyene.

As the polyene, there can be preferably used a polyene having 4 to 20 carbon atoms or a resin containing a unit derived from a chain-like or cyclic conjugated or non-conjugated polyene. As these monomers, there can be exemplified conjugated dienes such as butadiene and isoprene; chain-like non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene; cyclic non-conjugated dienes such as methyltetrahydroindene, 5-ethylindene-2-norbornene, 5-methylene-2-norbornene, 5-isopropylindene-2-norbornene, 5-vinylindene-2-norbornene, 6-chloromethyl-5-isopropenyl-2-norbornene and dicyclopentadiene; and trienes and chloroprenes such as 2,3-diisopropylindene-5-norbornene, 2-ethylindene-3-isopropylindene-5-norbornene and 2-propenyl-2,2-norbornadiene.

These polyenes are incorporated in a homopolymer, in a random copolymer or in a block copolymer in a single kind, in a combination of two or more kinds or in a combination with other monomers.

As a monomer used in combination with the polyene, there can be used α-olefins having 2 to 20 carbon atoms, such as ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene. There can be further used monomers such as styrene, vinyltoluene, acrylonitrile, methacrylonitrile, vinyl acetate, methyl methacrylate and ethyl acrylate.

Concrete examples of the polyene polymers include polybutadiene (BR), polyisoprene (IR), butyl rubber (IIR), natural rubber, nitrile-butadiene rubber (NBR), styrene-butadiene rubber (SBR), chloroprene rubber (CR), and ethylene-propyrene-diene rubber (EPDM), which, however, are in no way to limit the scope of the invention.

There is no particular limitation on the carbon—carbon double bond in the polymer which may exist in the form of vinylidene group in the main chain or in the form of a vinyl group in the side chain.

It is desired that the polyene polymer has a carboxylic acid group, a carboxylic anhydride group or a hydroxyl group that is introduced therein. As a monomer for introducing these functional groups, there can be used an ethylenically unsaturated monomer having the above-mentioned functional groups.

As the monomer, it is desired to use an unsaturated carboxylic acid or a derivative thereof. Concrete examples include α,β-unsaturated carboxylic acids such as acrylic acid, methacrylic acid, maleic acid, fumaric acid, itaconic acid, citraconic acid and tetrahydrophthalic acid; unsaturated carboxylic acids such as bicyclo[2,2,1]hepto-2-en-5,6-dicarboxylic acid; α,β-unsaturated carboxylic anhydrides such as maleic anhydride, itaconic anhydride, citraconic anhydride, and tetrahydrophthalic anhydride; and unsaturated carboxylic anhydrides such as bicyclo[2,2,1]hepto-2-en-5,6-dicarboxylic anhydride.

The polyene polymer modified with an acid is prepared by using a resin having a carbon—carbon double bond as a base polymer, and graft-copolymerizing the base polymer with an unsaturated carboxylic acid or with a derivative thereof by known means. The polyene polymer modified with an acid can be further prepared by random-copolymerizing the above-mentioned polyene with an unsaturated carboxylic acid or with a derivative thereof.

It is desired that the acid-modified polyene polymer particularly suited for achieving the object of the present invention contains an unsaturated carboxylic acid or a derivative thereof in an amount of from 0.01 to 10% by weight.

When the content of the unsaturated carboxylic acid or the derivative thereof lies within the above-mentioned range, the acid-modified polyene polymer disperses well in the thermoplastic resin and, besides, oxygen is smoothly absorbed.

A polyene polymer modified with a hydroxyl group and having the hydroxyl group at the terminal, can also be favorably used.

It is desired that the polyene polymer used in the present invention has a viscosity that lies in a range of from 1 to 200 Pa·s at 40° C. from the standpoint of workability of the oxygen-absorbing resin composition.

[Transition Metal Catalyst]

As the transition metal catalyst used in the present invention, it is desired to use a metal component of the Group VIII of periodic table, such as iron, cobalt or nickel, as well as a metal of the Group I, such as copper or silver, a metal of the Group IV, such as tin, titanium or zirconium, a metal of the Group V, such as vanadium, a metal of the Group VI, such as chromium and a metal of the Group VII, such as manganese. Among these metals, cobalt absorbs oxygen at a large rate and is particularly suited for accomplishing the object of the present invention.

The transition metal catalyst is usually used in the form of an inorganic acid salt, an organic acid salt or a complex of a low valency of the above-mentioned transition metals.

As the inorganic acid salt, there can be exemplified a halide such as chloride, an oxyacid salt of sulfur such as sulfate, an oxyacid salt of nitrogen such as nitrate, an oxyacid salt of phosphorus such as phosphate, and a silicate.

As the organic acid salt, there can be exemplified a carboxylate, a sulfonate and a phosphonate. Among them, the carboxylate is suited for the object of the present invention. Concrete examples thereof include transition metal salts such as of acetic acid, propionic acid, isopropionic acid, butanoic acid, isobutanoic acid, pentanoic acid, isopentanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroceric acid, oleic acid, linolic acid, linoleic acid, arachidonic acid, formic acid, oxalic acid, sulfamic acid, and naphthenic acid.

As the complex of the transition metal, on the other hand, there can be used a complex with a β-diketone or a β-keto-acid ester. As the β-diketone or the β-keto-acid ester, there can be used, for example, acetylacetone, acetoethyl succinate, 1,3-cyclohexadion, methylene bis-1,3-cyclohexadion, 2-benzyl-1,3-cyclohexadione, acetyltetralone, palmitoyltetralone, stearoyltetralone, benzoyltetralone, 2-acetylcyclohexanone, 2-benzoylcyclohexanone, 2-acetyl-1,3-cyclohexanedion, benzoyl-p-chlorobenzoylmethane, bis(4-methylbenzoyl) methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl) methane, benzoylacetylphenylmethane, stearoyl(4-methoxybenzoyl)methane, butanoylacetone, distearoylmethane, acetylacetone, stearoylacetone, bis (cyclohexanoyl)-methane and dipivaloylmethane.

[Oxygen-Absorbing Layer]

In the resin composition used for the oxygen-absorbing layer formed in the packaging material of the present invention, it is desired that the organic oxidizing component is contained in an amount of from 0.01 to 10% by weight and, particularly, from 1.0 to 7% by weight.

In the resin composition, further, it is desired that the transition metal catalyst is contained in the oxygen-absorbing layer in an amount of at least 300 ppm calculated as a transition metal and, specifically, in an amount of from 310 to 800 ppm calculated as cobalt.

The thermoplastic resin can be blended with the organic oxidizing component and with the transition metal catalyst by a variety of means. They can be blended in any order without limitation.

For example, the thermoplastic resin is dry-blended or melt-blended with the organic oxidizing component so as to easily prepare a blend of the two. The transition metal catalyst, on the other hand, is used in a small amount compared to the thermoplastic resin or the organic oxidizing component. In order to accomplish the homogeneous blending, therefore, the transition metal catalyst is usually dissolved in an organic solvent, and the solvent and the powdery or granular thermoplastic resin as well as the oxidizing polymer are mixed together, and, as required, the mixture is dried in an inert atmosphere.

As the solvent for dissolving the transition metal catalyst, there can be used an alcohol solvent such as methanol, ethanol or butanol; an ether solvent such as dimethyl ether, diethyl ether, methyl ethyl ether, tetrahydrofurane or dioxane; a ketone solvent such as methyl ethyl ketone or cyclohexanone; or a hydrocarbon solvent such as n-hexane or cyclohexane. In general, the transition metal catalyst is dissolved at a concentration of from 5 to 90% by weight.

It is desired that the mixing of the thermoplastic resin, organic oxidizing component and transition metal catalyst and the subsequent preservation thereof, are conducted in a non-oxidizing atmosphere such that the composition is not oxidized in the preceding stage. For this purpose, it is desired to mix and dry them under a reduced pressure or in a nitrogen stream.

The mixing and drying can be executed by using an extruder or an injection machine which is of the ventilation type or is equipped with a dryer in a step preceding the molding step.

It is further allowable to prepare a master batch of a thermoplastic resin and/or an oxidizing polymer containing the transition metal catalyst at a relatively high concentration, and dry-blend the master batch with a non-blended thermoplastic resin, thereby to prepare an oxygen-absorbing resin composition.

According to the present invention, the polyamide resin is used as the thermoplastic resin after being dried under generally employed drying conditions of a temperature of from 120 to 180° C. under a pressure of from 0.5 to 2 mmHg for 2 to 6 hours.

Though generally not required, the oxygen-absorbing layer in the packaging material of the present invention may, as desired, be blended with a known activating agent. Preferred examples of the activating agent include polyethylene glycol, polypropylene glycol, ethylene-vinyl alcohol copolymer, ethylene-methacrylic acid copolymer, and hydroxyl group- and/or carboxyl group-containing polymers such as various ionomers.

These hydroxyl group- and/or carboxyl group-containing polymers can be blended in an amount of not larger than 30 parts by weight and, particularly, in an amount of from 0.01 to 10 parts by weight per 100 parts by weight of the thermoplastic resin.

The oxygen-absorbing layer used in the present invention may be blended with filler, coloring agent, heat-resistant stabilizer, weather-resistant stabilizer, anti-oxidant, anti-aging agent, photo stabilizer, ultraviolet ray-absorbing agent, anti-static agent, lubricating agent such as metal soap or wax, and a resinous blending agent such as resin or rubber for reforming according to known recipe.

By being blended with, for example, the lubricating agent, biting of the resin by the screw is improved. As the lubricating agent, there are generally used metal soaps such as magnesium stearate and calcium stearate, those of hydrocarbons, such as fluidized, natural or synthetic paraffin, microwax, polyethylene wax and chlorinated polyethylene wax, those of the aliphatic acid, such as stearic acid and lauric acid, those of the aliphatic acid monoamide or bisamide, such as stearic acid amide, palmitic acid amide, oleic acid amide, methylenebis stearo amide and ethylenebis stearo amide, those of the esters, such as butyl stearate, cured castor oil and ethylene glycol monostearate, and those of alcohols, such as cetyl alcohol and stearyl alcohol, as well as a mixed system thereof. It is desired that the lubricating agent is added in an amount of from 50 to 1000 ppm on the basis of the thermoplastic resin.

[Packaging Material]

According to the present invention, there can be obtained such packaging materials as cups, trays, bottles, tubular containers and closures in the form of a single oxygen-absorbing layer or a laminate in combination with at least one layer of any other resin.

It is generally desired that the oxygen-absorbing layer is formed on the inner side of the outer surface of the container so will not to be exposed to the outer surface, and is provided on the outer side of the inner surface of the container so will not to come in direct contact with the content. Thus, it is desired that the oxygen-absorbing layer is formed as at least one intermediate layer of the multi-layer container.

In the case of the multi-layer container, the other resin layer formed in combination with the oxygen-absorbing layer will be a humidity-resistant resin or a barrier resin, such as olefin resin or thermoplastic polyester resin.

Examples of the olefin resin include low-density polyethylene (LDPE), intermediate-density polyethylene (MDPE), high-density polyethylene (HDPE), linear low-density polyethylene (LLDPE) and linear very-low-density polyethylene (LVLDPE), as well as polypropylene (PP), ethylene-propylene copolymer, polybutene-1, ethylene-butene--1 copolymer, propyrene-butene-1 copolymer, ethylene-propylene-butene-1 copolymer, ethylene-vinyl acetate copolymer, ionically crosslinked olefin copolymer (ionomer) or blends thereof.

Examples of the thermoplastic polyester resin include polyethylene terephthalate (PET), polybutylene terephthalate (PBT), polyethylene naphthalate (PEN), copolymerized polyesters thereof and blends thereof.

The most preferred example of the gas-barrier resin will be an ethylene-vinyl alcohol copolymer (EVOH) which is a saponified copolymer obtained by, for example, saponifying an ethylene-vinyl acetate copolymer containing an ethylene in an amount of from 20 to 60 mol % and, particularly, from 25 to 50 mol % to a saponification degree of not lower than 96 mol % and, particularly, not lower than 99 mol %. The saponified ethylene-vinyl alcohol copolymer must have a molecular weight large enough for forming a film and must, generally, have a viscosity of not smaller than 0.01 dl/g and, particularly, not smaller than 0.05 dl/g as measured in a mixed solvent of phenol and water at a weight ratio of 85:15 at a temperature of 30° C.

As the barrier resin, there can be further used a cyclic olefin copolymer (COC) and, particularly, a copolymer of ethylene and cyclic olefin and, especially, the APEL manufactured by Mitsui Kagaku Co.

Described below are preferred examples of the laminated-layer structure with the oxygen-absorbing layer being expressed as OAR. Which layer be formed on the inner side can be freely selected depending upon the object.

Two-layer structure: PET/OAR, PE/OAR, PP/OAR

Three-layer structure: PE/OAR/PET, PET/OAR/PET, PE/OAR/PP, EVOH/OAR/PET, PE/OAR/COC Four-layer structure: PE/PET/OAR/PET, PE/OAR/EVOH/PET, PET/OAR/EVOH/PET, PE/OAR/EVOH/COC Five-layer structure: PET/OAR/PET/OAR/PET, PE/PET/OAR/EVOH/PET, PET/OAR/EVOH/COC/PET, PET/OAR/PET/COC/PET, PE/OAR/EVOH/COC/PET Six-layer structure: PET/OAR/PET/OAR/EVOH/PET, PE/PET/OAR/COC/EVOH/PET, PET/OAR/EVOH/PET/COC/PET Seven-layer structure: PET/OAR/COC/PET/EVOH/OAR/PET In preparing the laminated-layer structure, an adhesive resin may, as required, be interposed among the resin layers.

As the above-mentioned adhesive resin, there can be exemplified a thermoplastic resin containing a carbonyl (—CO—) group based on carboxylic acid, carboxylic anhydride, carboxylate, carboxylic acid amide or carboxylic acid ester on the main chain or on the side chain at a concentration of 1 to 700 milliequivalents (meq)/100 g of the resin and, particularly, at a concentration of 10 to 500 meq/100 g of the resin. Preferred examples of the adhesive resin include ethylene-acrylic acid copolymer, ionically crosslinked olefin copolymer, maleic anhydride-grafted polyethylene, maleic anhydride-grafted polypropylene, acrylic acid-grafted polyolefin, ethylene-vinyl acetate copolymer, copolymerized polyester and copolymerized thermoplastic resin, which may be used in one kind or in a combination of two or more kinds. These resins are useful for laminating the layers by the simultaneous extrusion or by the sandwich lamination.

The pre-formed gas-barrier resin film and the humidity-resistant resin film are adhered and laminated by also using a thermosetting adhesive resin such as isocyanate or epoxy.

In the packaging material of the present invention, there is no particular limitation on the thickness of the oxygen-absorbing layer. Generally, however, it is desired that the thickness of the oxygen-absorbing layer is in a range of from 1 to 100 $\mu$m and, particularly, from 5 to 50 $\mu$m. Namely, when the thickness of the oxygen absorbing layer becomes smaller than a given range, the oxygen-absorbing performance is deteriorated. Even when the thickness of the oxygen absorbing layer becomes larger than the given range, on the other hand, no distinguished advantage is obtained concerning the oxygen-absorbing performance but the amount of the resin increases bringing about disadvantage in economy and container properties such as drop in the flexibility and softness of the materials.

The total thickness of the packaging material of the present invention may differ depending upon the use but is, usually, from 30 to 7000 $\mu$m and, particularly, from 50 to 5000 $\mu$m. It is, on the other hand, desired that the thickness of the oxygen-absorbing intermediate layer is from 0.5 to 95% and, particularly, from 1 to 50% of the whole thickness.

The packaging material of the present invention can be produced by a known method except the formation of the above-mentioned oxygen-absorbing layer.

For example, the film, sheet or tube is formed by melt-kneading the above-mentioned resin composition by using the extruder and, then, extruding it into a desired shape through a T-die or a circular die (ring die). Namely, a T-die method film and a blown film are obtained. The T-die film is biaxially stretched to obtain a biaxially stretched film.

The resin composition is melt-kneaded by using the injection machine and is, then, injected into an injection metal mold to obtain a container and a preform for producing the container.

Further, the resin composition is extruded into a predetermined molten resin mass through the extruder and is compression-molded in a metal mold to obtain the container or the preform for producing the container.

The molded article may assume the shape of a film, a sheet, a parison or a pipe for forming bottles and tubes, and a preform for producing bottles and tubes.

The bottle is easily formed from the parison, pipe or preform by pinching off the extruded article by using a pair of split molds and by blowing a fluid therein.

The pipe or the preform that is cooled is, then, heated at a stretching temperature, stretched in the axial direction through one step or many steps, and is blow-stretched in the circumferential direction with the fluid pressure to obtain a stretch-blown bottle.

Further, the film or the sheet is subjected to vacuum-molding, pressurized air-molding, stretch-molding or plug-assisted molding to obtain packaging containers of the shape of cups and trays as well as a closure member of a film or a sheet.

The packaging materials such as films can be used as packaging bags of a variety of forms and can be produced by a known bag-producing method. Examples include ordinary pouches which are sealed along the three sides or the four sides, pouches with a cassette, standing pouches and pillow packaging bags, to which only, however, the invention is in no way limited.

The multi-layer extrusion-molded article can be produced relying upon a known co-extrusion molding method, i.e., by conducting the extrusion-molding in the same manner as described above but using extruders in a number corresponding to the kinds of the resins and using multi-layer multiple dies.

Further, the multi-layer injection-molded article can be produced relying upon the co-injection method or the sequential injection method by using injection molding machines in a number corresponding to the kinds of the resins.

The multi-layer film and the multi-layer sheet can be produced relying upon the extrusion coating method or the sandwich lamination. The multi-layer film or the sheet can also be produced by dry-laminating the films that have been formed in advance.

In the packaging material and, particularly, in the multi-layer container of the present invention, it is desired that the thermoplastic resin in the oxygen-absorbing layer is a xylylene group-containing polyamide resin and, particularly, that the exothermic peak of the polyamide resin due to the crystallization is not larger than 10 J/g as measured by using the differential scanning calorimeter (DSC) and a half-value width of a maximum value of a peak profile at 2 $\theta$=0 to 100 degrees is not larger than 10 degrees as measured by the X-ray analysis. This makes it possible to suppress a change in the structure of the xylylene group-containing polyamide during the preservation of the container or after the heat treatment of the container and, hence, to maintain a b-value of the container due to haze and color-difference meter at the initial value.

In general, the crystals of a polymer, too, are in a state of a low energy like the crystals of ordinary compounds, exhibiting the flow of heat at the time of transition between the crystalline state and the amorphous state, absorbing heat when the crystals are being extinguished due to melting and generating heat when the crystals are formed from the amorphous state. These phenomena are observed as an endothermic peak and an exothermic peak in the measurement by using the differential scanning calorimeter (DSC).

Figure 2:
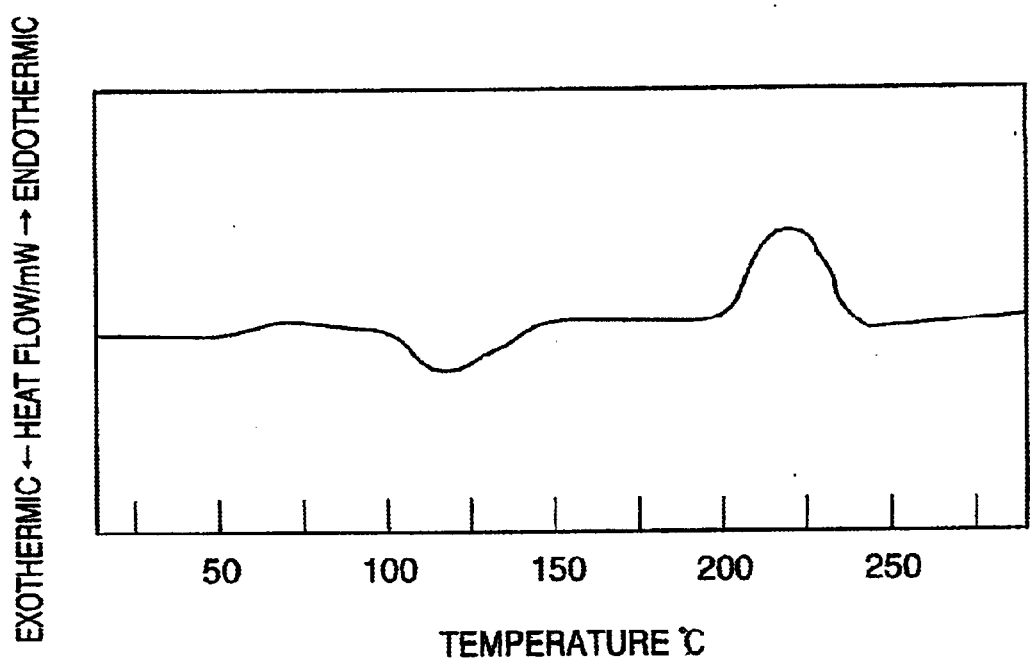
FIG. 2 is a graph of a differential scanning calorimetric curve of a polyamide derived from a xylylene diamine and an adipic acid.

FIG. 2 is a graph of a differential scanning calorimetric curve of a polyamide derived from a xylylene diamine and an adipic acid, wherein the abscissa represents the temperature and the ordinate represents the flowing amount of heat, the endothermic peak protruding upward and the exothermic peak protruding downward.

In the present invention, the exothermic peak at the crystallization temperature of the xylylene group-containing polyamide which is a thermoplastic resin of the oxygen-absorbing layer is suppressed to lie in a range of not smaller than 10 J/g as described above, making it possible to maintain the haze of the container at a low level which is nearly the same as the initial value.

Figure 3:
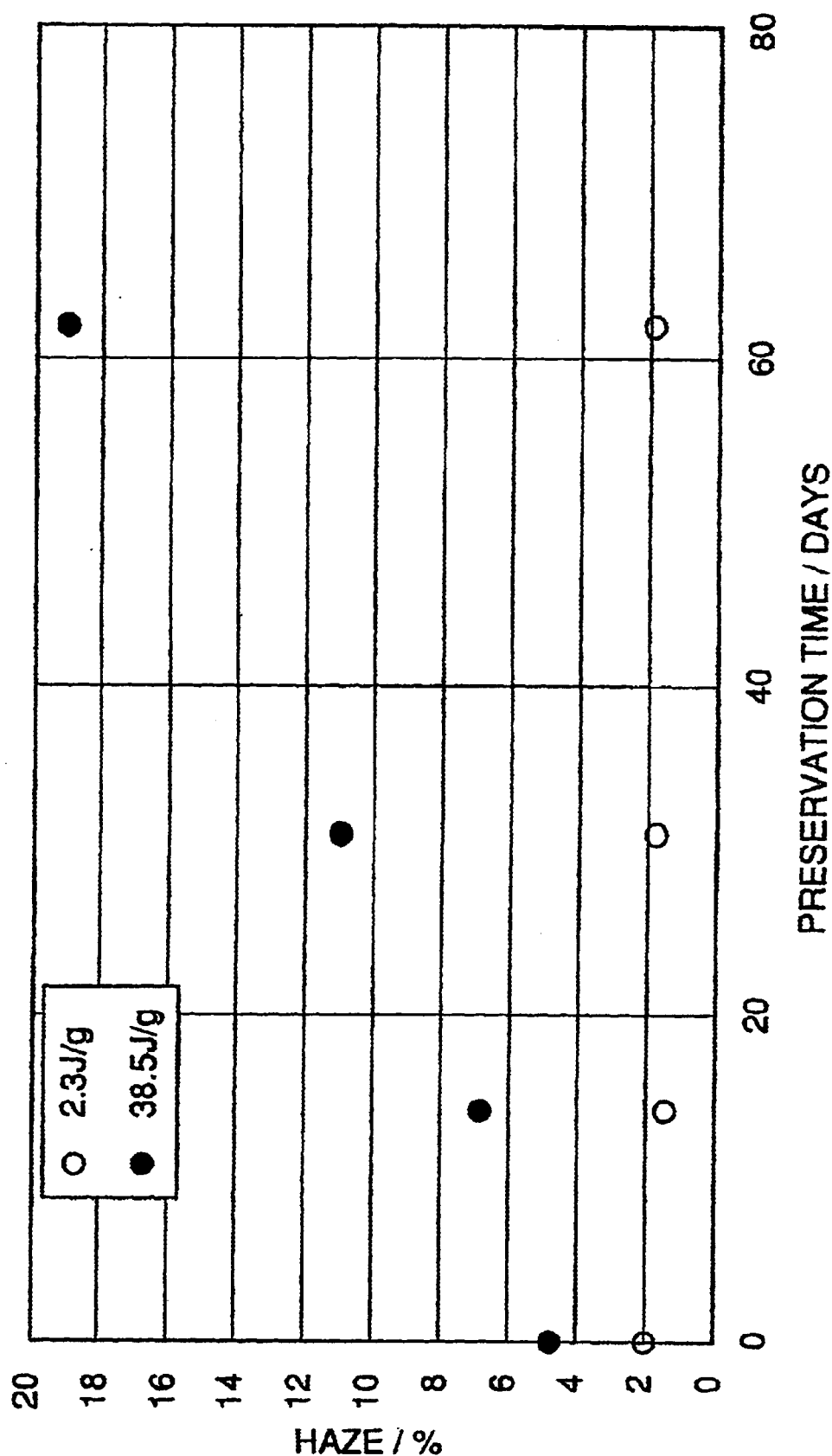
FIG. 3 is a graph plotting a relationship between the preservation time (days) and the haze (%) of a panel portion of a container barrel by using xylylene group-containing polyamides that generate the heat of crystallization in amounts of 2.3 J/g and 38.5 J/g.

Reference should be made to FIG. 3 which is a graph plotting a relationship between the preservation time (days) and the haze (%) of a panel portion of a container barrel by using a xylylene group-containing polyamide that generates the heat of crystallization in an amount of 2.3 J/g and a xylylene group-containing polyamide that generates the heat of crystallization in an amount of 38.5 J/g.

The above results tell that the haze value monotonously increases with the passage of time in the case of the xylylene group-containing polyamide which generates the heat of crystallization in an amount larger than the range specified by the invention, whereas the haze value is suppressed to stay on a low level same as the initial value irrespective of the passage of time in the case of the xylylene group-containing polyamide which generates the heat of crystallization in an amount that lies within the range specified by the invention.

The amount of heat generation at the crystallization temperature referred to in this specification stands for the amount of the amorphous component that is existing in the amorphous state in the xylylene group-containing polyamide resin but that can be crystallized as it passes through the crystallization temperature, i.e., stands for the amount of the amorphous component that can be crystallized. The fact that this amount is not larger than 10 J/g means that a considerable proportion of the amorphous component of the polyamide has been crystallized or is assuming a structure that can be thermally crystallized little.

In the container of the present invention having the above-mentioned features, the haze at the barrel portion is generally not larger than 4% and is suppressed to be of a low level same as the initial value even after the passage of long periods of time presumably due to the structure that tends to be thermally crystallized little as described above.

The diffraction peaks can be found by the X-ray diffraction by using a curved PSPC (position sensitive proportional counter) micro diffractometer. According to the X-ray diffraction method, a peak due to the scattering of the air also appears. Therefore, a true peak is found by measuring the diffraction peak of the sample, then, measuring the diffraction peak without the sample, and subtracting the latter peak from the former peak.

Measurement of the diffraction peak of the oxygen absorbing layer is carried out by same method of "(8) X-ray diffraction measurement" as follows.

Figure 4:
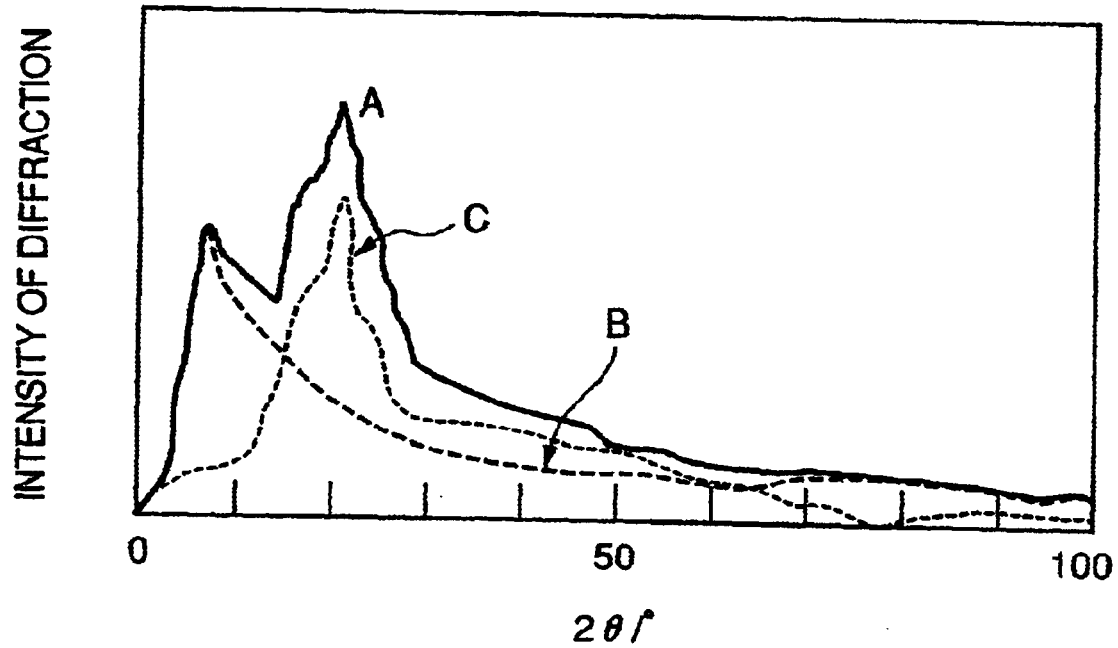
FIG. 4 is a graph of X-ray diffraction images of the xylylene group-containing polyamide layer in the barrel of the container of the present invention, wherein a curve A represents a diffraction image using a sample, a curve B represents a diffraction image without the sample, and a curve C represents a diffraction image of a difference between them.

FIG. 4 is a graph of X-ray diffraction images of the oxygen absorbing layer of the barrel of the container of the present invention, wherein a curve A represents a diffraction image using a sample, a curve B represents a diffraction image without the sample, and a curve C represents a diffraction image of a difference between them.

A peak height H of a diffraction image C is found and a horizontal line is drawn at a position of a height H/2 to find a half-value width $D_{1/2}$.

In the X-ray diffraction of crystals, in general, it has been known that an intensity peak appears in the interference when the following Bragg's formula (1), $$n\lambda = 2 d_{hkl} \sin \theta \quad (1)$$

wherein n is a degree, $\lambda$ is a wavelength of the X-ray, $d_{hkl}$ is a spacing of the crystals (hkl), and $\theta$ is a diffraction angle, is satisfied, and there also exists a relationship represented by the following Scherrer's formula (2), $$L_{hkl} = K\lambda / H \cos \theta \quad (2)$$

wherein $L_{hkl}$ is a size in a direction perpendicular to the plane (hkl) of the crystals, K is a constant which is about 0.9, H is a half-value width (radian) of an interference peak, and $\lambda$ and $\theta$ are the same as those defined in the above formula (1), between the sharpness of the interference peak and the size of the crystals.

The X-ray diffraction profile which is dealt with by the present invention is based upon the molecular orientation of the xylylene group-containing polyamide. Therefore, the fact that the half-value width $D_{1/2}$ of a maximum value of the profile is small, represents that the xylylene group-containing polyamide layer in the container of the present invention has been molecularly oriented to a large degree, i.e., has been oriented and crystallized to a large degree.

In the present invention, there exists an intimate relationship between the amount of heat generated due to the crystallization of the xylylene group-containing polyamide and the half-value width $D_{1/2}$ of the X-ray diffraction peak. In the case of the xylylene group-containing polyamide that generates heat due to the crystallization in an amount of 38.5 J/g that lies outside the range of the present invention, half-value widths $D_{1/2}$ of maximum values of the X-ray diffraction profile are 12.1 degrees (direction of height) and 11.0 degrees (circumferential direction). In the case of the xylylene group-containing polyamide that generates heat due to the crystallization in an amount of 2.3 J/g that lies within the range of the present invention, on the other hand, the half-value widths $D_{1/2}$ of the X-ray diffraction peaks are 8.5 degrees (direction of height) and 9.9 degrees (circumferential direction). In the oxygen-absorbing layer having the xylylene group-containing polyamide resin in the container of the present invention, it is believed that the xylylene group-containing polyamide is molecularly oriented to a large degree, i.e., oriented and crystallized to a large degree suppressing the thermal crystallization (lamellation) with the passage of time.

It is further believed that the xylylene group-containing polyamide that is molecularly oriented, i.e., that is oriented and crystallized, is prevented from being tinted yellow after the passage of time and after the heat treatment of the xylylene group-containing polyamide resin layer (oxygen-absorbing layer) in addition to accomplishing the above-mentioned advantages.

Usually, the degree of being tinted yellow of the resin can be evaluated in terms of the b-value using the color-difference meter. The brightness L in the color-difference formula, and color coordinates a, b in the Hunter's color-difference formula, have been specified under JIS Z 8730-1995. The coordinate values L, a and b can be directly read by using the color-difference meter.

Figure 5:
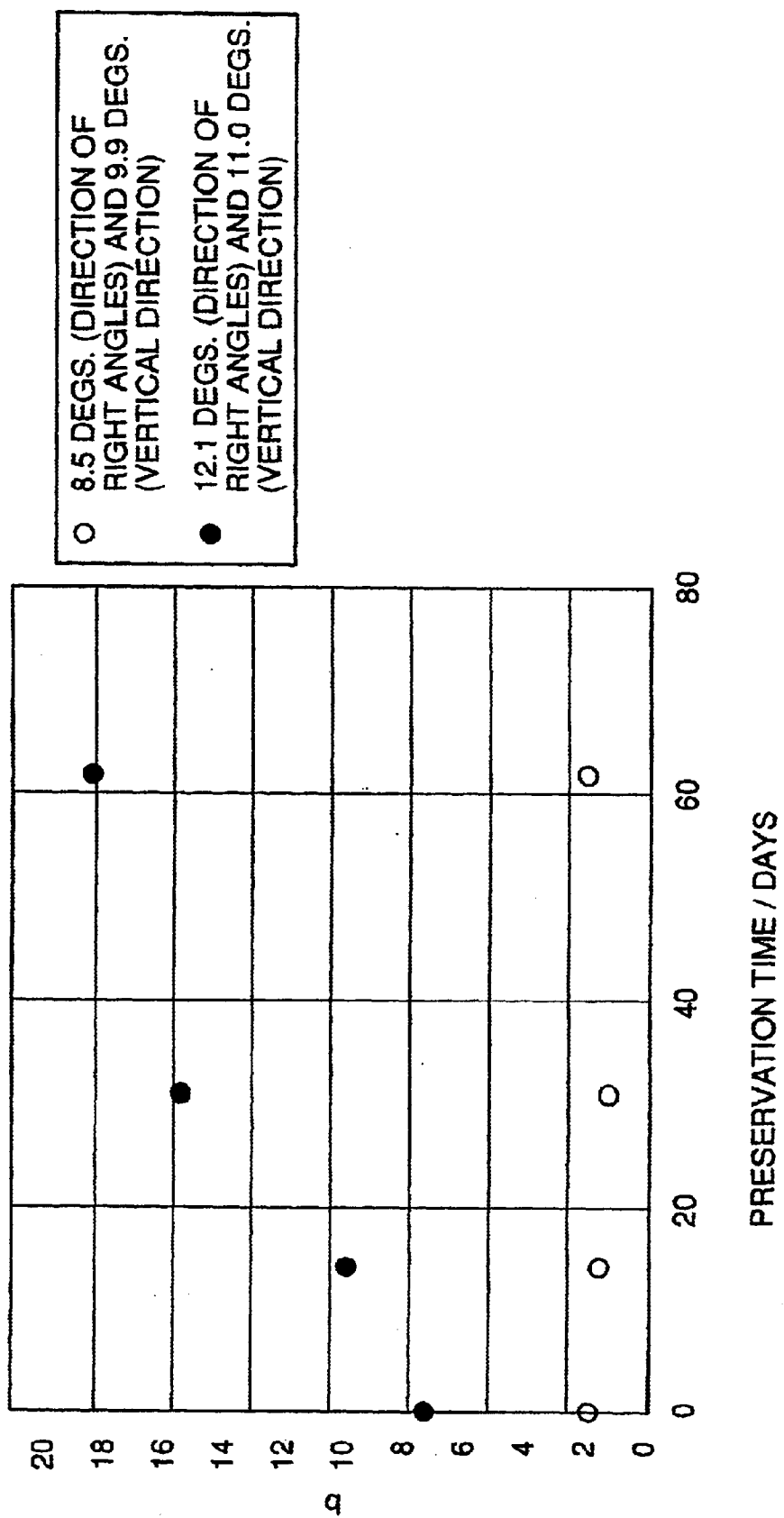
FIG. 5 is a graph plotting a relationship between the preservation time (days) and the b-value of the panel portion of the container barrel by using xylylene group-containing polyamides having half-value widths $D_{1/2}$ of maximum values of an X-ray diffraction profile of 8.5 degrees (direction of height) and 9.9 degrees (circumferential directions), and 12.1 degrees (direction of height) and 11.0 degrees (circumferential direction).

Reference should be made to FIG. 5 which is a graph plotting a relationship between the preservation time (days) and the b-value of the panel portion of the container barrel by using a xylylene group-containing polyamide having half-value widths $D_{1/2}$ of maximum values of an X-ray diffraction profile of 8.5 degrees (direction of height) and 9.9 degrees (circumferential directions), and a xylylene group-containing polyamide having half-value widths $D_{1/2}$ of maximum values of an X-ray diffraction profile of 12.1 degrees (direction of height) and 11.0 degrees (circumferential direction).

It is obvious from the above results that in the case of the xylylene group-containing polyamide layer having half-value widths $D_{1/2}$ of maximum values of the X-ray diffraction profile larger than the ranges specified by the present invention, the initial b-value is large and, besides, the b-value monotonously increases with the passage of time. In the case of the xylylene group-containing polyamide layer having half-value widths $D_{1/2}$ of maximum values of the X-ray diffraction profile lying within the ranges specified by the present invention, it is obvious that the b-value is suppressed to be not larger than 2.5 and, besides, the b-value is suppressed to be of a low level same as the initial value.

In the multi-layer container of the present invention, further, a layer of a thermoplastic polyester resin is formed on at least one side of the oxygen-absorbing layer. Here, it is desired that the crystallinity of the thermoplastic polyester resin layer is from 30 to 55% and/or that the half-value width of the X-ray diffraction profile is not larger than 15°.

Upon selecting the crystallinity of the thermoplastic polyester resin layer forming the inner layer and/or the outer layer of the container to be from 30 to 55%, it is made possible to prevent the deformation at the time of hot-filling the content and during the subsequent cooling. In particular, a high degree of crystallization of the inner and outer layers makes it possible to improve the barrier property, suppress the loss of properties of the oxygen-absorbing layer before filling the content, and decrease the amount of oxygen permeation after the content is filled. Besides, the outer surface that is highly crystallized is not get scarred easily.

Upon selecting the half-value width of the X-ray diffraction profile of the thermoplastic polyester resin layer to be not larger than 15°, further, the inner layer and/or the outer layer exhibit improved gas-barrier property, the water of the content arrives little at the oxygen-absorbing layer between the inner layer and the outer layer, preventing a drop in the gas-barrier property caused by the absorption of humidity by the oxygen-absorbing layer.

Further, when oxygen infiltrates from the external side and when the content is a carbonated beverage, the carbonic acid gas is prevented from flowing to the outer side.

The packaging material of the present invention is useful as a container capable of preventing a decrease in the flavor of the content caused by oxygen.

Examples of the content that can be filled include beverages such as beer, wine, fruit juice, carbonated soft drinks, foods such as fruits, nuts, vegetables, meet products, infant's foods, coffee, jam, mayonnaise, ketchup, edible oils dressings, sauces, foods boiled in soy and milk products, as well as medicines, cosmetics and gasoline, that are subject to be degraded in the presence of oxygen, which, however, are in no way to limit the scope of the present invention.

EXAMPLES

The present invention will now be described by way of Examples to which only, however, the invention is in no way limited. The evaluation is based on the methods described below.

(1) Measurement of the Amount of Oxygen Permeating Through the Multi-Layer Film and the Multi-Layer Container.

① A PP/steel foil-laminated cup-like container (HIRETOFLEX manufactured by Toyo Seikan Co.) having a content of 52.0 ml was filled with 1 cc or water, and was heat-sealed with a closure of a multi-layer film in a nitrogen atmosphere. The cup was not treated or was boiled at 95° C. for 30 minutes, and was preserved at 30° C.·80%RH. The concentration of oxygen in the cup was measured by using a gas chromatography (GC-8AIT, GC-3BT, both manufactured by Shimazu Seisakusho Co., detector: TCD (100° C.), column: molecular sieve 5A (60° C.), carrier gas: argon), and the amount of oxygen that has permeated through was calculated from the concentration of oxygen.

② A multi-layer container was filled with 3 cc of water and was heat-sealed with an aluminum-containing closure member in a nitrogen atmosphere. The multi-layer container was not treated or was boiled at 85° C. for 30 minutes, and was preserved at 30° C.·80%RH. The concentration of oxygen in the multi-layer container was measured by using the above gas chromatography, and the amount of oxygen that has permeated through was calculated from the concentration of oxygen.

(2) Measurement of the Concentration of Oxygen Dissolved in the Multi-Layer Container.

The bottle was filled with ultra-pure water heated at 93° C. leaving a head space of 15 ml, sealed with a cap, and was immersed in a hot water bath maintained at 77° C. for 5 minutes. The multi-layer bottle filled with ultra-pure water was taken out from the hot water bath, and was allowed to naturally cool all night at normal temperature and under normal pressure. Then, the ultra-pure water in the bottle was drained. Thereafter, the multi-layer bottle was filled with oxygen-free water while blowing a nitrogen gas therein, and was sealed with an aluminum cap without permitting air bubbles to enter therein. The multi-layer bottle was preserved at 55° C., and the concentration of oxygen dissolved in the water in the multi-layer bottle was measured by using an instrument for measuring the concentration of oxygen dissolved in water (oxygen indicator: Orbisphere Laboratories).

(3) Measurement of the Amount of Oxygen Absorbed.

An oxygen-absorbing film was cut into a size of 35 $cm^2$, introduced into the HIRETOFLEX (HR78-84W, manufactured by Toyo Seikan Co.) container having a volume of 60 ml, which was, then, heat-sealed with an aluminum-containing closure member and was preserved under a condition of 23° C. or 50° C. After preserved for a predetermined period of time, concentration of oxygen was measured by using a gas chromatography (GC-8AIT, GC-3BT, both manufactured by Shimazu Seisakusho Co., detector: TCD (100° C.), column: molecular sieve 5A (60° C.), carrier gas: argon). The absorbed amount per a gram of the oxygen-absorbing composition was calculated from the concentration of oxygen, and was regarded to be the absorbed amount of oxygen.

(4) Measurement of Tensile Strengths of the Oxygen-Absorbing Film and of the Oxygen-Absorbing Layer in the Bottle.

The oxygen-absorbing film or the oxygen-absorbing layer of the bottle after its amount of oxygen absorption has been measured was cut into a size as specified under JIS K 7127, and was measured for its tensile strength by using the Tensilon (UCT-5T: manufactured by Orientek Co.) equipped with a load cell of 5 kg. Each sample was measured three times repetitively.

(5) Observation of Dispersion of Unsaturated Double-Bonded Polymer in the Thermoplastic Resin.

A sample piece including an oxygen-absorbing layer and measuring 3 mm wide and 12 mm long was cut out from a panel portion of the multi-layer bottle or from the multi-layer film, and was buried and solidified in an epoxy resin by using a silicon mold. The sectional surface of the oxygen-absorbing layer was exposed by using the microtome, and the exposed surface only was washed with chloroform (special grade for high-speed liquid chromatograph: produced by Kishida Kagaku Co.) with stirring for one hour, dried for 12 hours, and was pre-treated by being deposited with Pt in vacuum with 10 mA for one minute. The sectional surface of the pre-treated bottle was observed by using a scanning electron microscope (JSM-6300F: manufactured by Nihon Denshi Co.) with an acceleration voltage of 10 kV.

(6) Measurement of the Amino End Group Concentration (AEG)

0.6 Milligrams of the sample was dissolved in 50 ml of a phenol/ethanol mixed solution (volume ratio of 4/1), and was titrated with stirring while adding 20 ml of an ethanol/water mixed solvent (volume ratio of 3/2). A 1/200 N ethanol hydrochloride/water mixed normal solution (volume ratio of 1/9) was used as a titration solution, and a methyl orange was used as an indicator. Further, the same operation was carried out without adding sample to conduct blank measurement.

The amino end group concentration (AEG) was found from the amount of titration in compliance with the following formula. When a transition metal catalyst was contained in the sample, AEG' was found by titration by dissolving the catalyst of the same amount only and was subtracted to find the AEG of the sample.

$$AEG(eq/10^6 \ g) = [\{(V-V_O) \times N \times f\}/W] \times 10^3 - AEG'$$

V: amount (ml) of the 1/200 N ethanol hydrochloride/water mixed normal solution (volume ratio of 1/9) used for titrating the sample, $V_O$: amount (ml) of the 1/200 N ethanol hydrochloride/water mixed normal solution (volume ratio of 1/9) used for the blank titration, N: normality of ethanol/water mixed normal solution, f: factor of the normal solution, W: sample weight (g), AEG': correction value (when the sample contains a transition metal catalyst).

(7) DSC Measurement.

The amount of heat generated by the crystallization of the bottle barrel portion was found by using a differential scanning calorimeter (DSC7 manufactured by Perkin Elmer Co.) at the time when the temperature was raised from 20° C. up to 290° C. at a rate of 10° C./minute.

(8) X-ray Diffraction Measurement.

The oxygen-absorbing layer measuring 50 mm high (direction of the bottle height) and 10 mm wide (circumferential direction of the bottle) was cut out from the barrel portion of the multi-layer bottle, folded in many layers while maintaining the longitudinal and transverse directions thereof to use it as a sample which was measured for its diffraction profile by using a micro X-ray diffraction apparatus (PSPC-150C: manufactured by Rigaku Denki Co.). Similarly, the polyester layer was cut out from the barrel portion of the multi-layer bottle ot use it as a sample which was measured for its diffraction profile. The X-ray was focused into a fine beam by using a collimator, and was projected onto the surface of the sample perpendicularly thereto. Measurement was taken by so setting that the direction of height of the bottle was at right angles (direction of height), and in parallel (circumferential direction), with the optical axis of the X-rays and with the plane inclusive of a curved PSPC (position sensitive proportional counter, Bragg angle (2 θ=0 to 100°). The scattering of the air was subtracted from the obtained X-ray diffraction profile to find a diffuse scattering peak and a half-value width.

(9) Measurement of the B-Value and Haze.

The panel portion of the multi-layer bottle was cut out before being filled with the water of 85° and after filled with the water and preserved for a predetermined period of time at 55° C. The multi-layer panel portion was measured for its b-value and haze by using an SM color computer (manufactured by Suga Shikenki Co.).

(10) Crystallinity x.

A narrow piece (about 2 mm×2 mm) of a sample to be measured was sedimented in a water-calcium nitrate density-gradient tube set at 20° C. to measure a specific gravity d from a position at where the sample becomes stationary.

The crystallinities x were calculated from the measured specific gravities d in compliance with the following formula, $$(1/d) = [(1-x)/da] + (x/dc)$$

where da is a specific gravity (da=1.335) of when x is 0%, and dc is a specific gravity (dc=1.455) of when x is 100%.

(11) Load at Yielding Point y.

The polyester layer to be measured was cut into a short strip (5 mm×5 mm) and was measured by using the Tensilon [UCT-5T manufactured by Orientek Co.] equipped with a load cell of 100 kgf under the conditions of 23° C., 50%RH, a measuring length of 20 mm and a pulling rate of 30 mm/min.

A value of a maximum point appearing first from the start of measurement was regarded to be the load at yielding point.

(12) Heat Resistance (Heat Shrinking Factor) S of the Container.

A sample bottle to be measured was fully filled with the tap water of a temperature of 20° C. to measure the fully filled volume of the sample bottle ($V_0$, unit in ml) in advance.

The container was then filled with hot water heated at 85° C. so that head-space is formed in a neck portion, capped, and was left to cool until the content (tap water) returned to room temperature (20° C.) to evaluate the deformation.

Then, the content was removed from the sample bottle. The sample bottle was fully filled again with tap water of a temperature of 20° C. to measure the fully filled volume ($V_1$, unit in ml).

Heat resistance (heat deformation factor) S (unit in %) of the container was calculated according to the following formula, $$S = 100 \times (1 - V_1/V_0)$$

Five bottles were measured for each kind, and the heat deformation factor S was found from an arithmetical mean value of the results of the five bottles for each kind.

Example 1

A resin composition was prepared by using a twin-screw extruder, the resin composition containing a polymetaxylyleneadipamide (MXD6) resin (T-600: produced by Toyoboseki Co.) as a thermoplastic resin on which a cobalt neodecanoate (DICANATE5000: produced by Dainihon Ink Kagaku Kogyo Co.) had been deposited in an amount of 310 ppm calculated as cobalt, and 5% by weight of a maleic acid-modified polybutadiene (M-2000-20: manufactured by Nihon Sekiyu Kagaku Co.) as an organic oxidizing component. An oxygen-absorbing film having a thickness of 20 μm was prepared from the above resin composition by using the Laboplastomill (produced by Toyo Seiki Seisakusho Co.). A polyethylene terephthalate (PET) film was laminated on one surface of the above film and a polypropylene (PP) film was laminated on the other surface thereof to obtain a multi-layer film of 12-μm PET/oxygen-absorbing film/50-μm PP. The multi-layer film was boiled at 95° C. for 30 minutes, and the amount of oxygen permeation into the container was measured after preserved at 30° C. and 80%RH for 14 days. The oxygen-absorbing film was further preserved at 23° C. and at 50° C. for a predetermined period of time. The absorption of oxygen was confirmed by using the gas chromatography and the tensile strength was measured by using the Tensilon. Further, the oxygen-absorbing layer in the sample cut from the multi-layer film was observed by using an electron microscope of a magnification of 25000 times. The results were as shown in Tables 1 and 2.

Example 2

A multi-layer film was prepared under the same conditions as those in Example 1 but using the above-mentioned cobalt neodecanoate as the transition metal catalyst in an amount of 400 ppm calculated as cobalt, in order to measure the amount of oxygen permeated into the container and to observe the oxygen-absorbing layer by using an electron microscope. The results were as shown in Table 1.

Example 3

A multi-layer film was prepared in the same manner as in Example 1 but using the cobalt neodecanoate as the transition metal catalyst in an amount of 400 ppm calculated as cobalt and using a hydroxyl group-modified polyisoprene (OH-ip)(Poly ip; produced by Idemitsu Sekiyu Kagaku Co.) as the organic oxidizing component in an amount of 3% by weight, in order to measure the amount of oxygen permeated into the container and to observe the oxygen-absorbing layer by using an electron microscope. The results were as shown in Table 1.

Example 4

A resin composition was prepared by using a twin-screw extruder, the resin composition containing a PET resin (J-125T: produced by Mitsui Kagaku Co.) as a thermoplastic resin on which the above-mentioned cobalt neodecanoate had been deposited in an amount of 310 ppm calculated as cobalt, and 5% by weight of the above-mentioned maleic acid-modified polybutadiene as an organic oxidizing component. An oxygen-absorbing film having a thickness of 20 μm was prepared from the above resin composition. A PET film was laminated on one surface of the above film and a PP film was laminated on the other surface thereof to obtain a multi-layer film of 12-μm PET/oxygen-absorbing film/ 50-μm PP. The multi-layer film was boiled at 95° C. for 30 minutes, and the amount of oxygen permeation into the container was measured after preserved at 30° C. and 80%RH for 14 days. Further, the oxygen-absorbing layer in the sample cut from the multi-layer film was observed by using an electron microscope in the same manner as in Example 1. The results were as shown in Table 1.

Comparative Example 1

A multi-layer film was prepared in the same manner as in Example 1 but using the above-mentioned cobalt neodecanoate as the transition metal catalyst in an amount of 400 ppm calculated as cobalt and using the above-mentioned maleic acid-modified polybutadiene as the organic oxidizing component in an amount of 15% by weight, but could not be formed.

Comparative Example 2

A multi-layer film was prepared in the same manner as in Example 1 but using the above-mentioned cobalt neodecanoate as the transition metal catalyst in an amount of 200 ppm calculated as cobalt and without being blended with the organic oxidizing component, in order to measure the amount of oxygen permeated into the container. The results were as shown in Table 1.

Comparative Example 3

A multi-layer film was prepared under the same conditions as those of Example 1 but without being blended with the organic oxidizing component, in order to measure the amount of oxygen permeated into the container. The results were as shown in Table 1.

Comparative Example 4

A multi-layer film was prepared in the same manner as of Example 1 but using the above-mentioned cobalt neodecanoate as the transition metal catalyst in an amount of 800 ppm calculated as cobalt and without being blended with the organic oxidizing component, in order to measure the amount of oxygen permeated into the container. The results were as shown in Table 1.

Comparative Example 5

An oxygen-absorbing film was prepared in the same manner as in Example 1 but being blended with 5% by weight of a polybutadiene (B-2000: produced by Nihon Sekiyu Kagaku Co.) as the organic oxidizing component. The results were as shown in Table 1.

Comparative Example 6

An oxygen-absorbing film was prepared in the same manner as in Example 1 but depositing the above-mentioned cobalt neodecanoate in an amount of 400 ppm calculated as cobalt on the MXD6 resin (6007: produced by Mitsubishi Gas Kagaku Co.) as a thermoplastic resin and without being blended with the organic oxidizing component. After preserved at 50° C. for 7 days, the film was measured for its amount of oxygen absorption and tensile strength by using the Tensilon. The results were as shown in Table 2.

TABLE 1

|  | $O_2$ permiation (cc/cup) note 1) | Minimum length of dispersant (nm) | Film formation note 2) |
| --- | --- | --- | --- |
| Example 1 | 0.000 | ≦400 | ◯ |
| Example 2 | 0.000 | ≦400 | ◯ |
| Example 3 | 0.072 | ≦200 | ◯ |
| Example 4 | 1.896 | ≦400 | ◯ |
| Comp. Ex. 1 | — | note 3) | X |
| Comp. Ex. 2 | 0.531 | — | ◯ |
| Comp. Ex. 3 | 0.535 | — | ◯ |

TABLE 1-continued

|  | $O_2$ permiation (cc/cup) note 1) | Minimum length of dispersant (nm) | Film formation note 2) |
|---|---|---|---|
| Comp. Ex. 4 | 0.604 | — | ○ |
| Comp. Ex. 5 | — | note 4) | X | note 1) measured in compliance with (1)-① above.
note 2) ○: favorably formed, good appearance, X: poorly formed, poor appearange
note 3) cloudy, film could not be formed.
note 4) gels of the order of microns were formed much.

TABLE 2

|  | Preservation temperature (° C.) | Preservation period (days) | $O_2$ absorption (cc/g) | Tensile strength (kgf/mm$^2$) |
|---|---|---|---|---|
| Ex.1 | 23 | 0 | 0 | 7.7 |
|  | 23 | 7 | 1.2 | 7.7 |
|  | 23 | 18 | 3.0 | 7.7 |
|  | 23 | 24 | 4.0 | 7.4 |
|  | 50 | 0 | 0 | 6.9 |
|  | 50 | 7 | 7.0 | 2.5 |
| Comp. Ex. 6 | 50 | 7 | 6.1 | not measured note 4) | note 4) Broken while setting the sample.

Example 5

A resin composition was prepared by using a twin-screw extruder, the resin composition containing the MXD6 resin used in Example 1 as a thermoplastic resin and on which the above-mentioned cobalt neodecanoate had been deposited in an amount of 310 ppm calculated as cobalt, and 5% by weight of the above-mentioned maleic acid-modified polybutadiene as an organic oxidizing component. A PET was supplied to an injector for forming inner and outer layers, and the above-mentioned resin composition was supplied to an injector for forming an intermediate layer. The resins were molded by being co-injected into an injection metal mold under the conditions of a temperature of the injection nozzles of 280° C. and a resin pressure of 250 kgf/cm$^2$ to obtain a two-material-three-layer preform having a weight of 32 g, the intermediate layer having a volume ratio of 6%. The multi-layer bottle was preserved at 55° C. for 28 days to measure the concentration of oxygen dissolved in the container. Further, the oxygen-absorbing layer that has absorbed oxygen was cut out from the multi-layer bottle and was measured for its tensile strength by using the Tensilon. The results were as shown in Tables 3 and 4.

Comparative Example 7

A multi-layer preform and a multi-layer bottle were prepared in the same manner as in Example 5 but by depositing the above-mentioned cobalt neodecanoate in an amount of 400 ppm calculated as cobalt on the MXD6 resin used in Example 5 as the thermoplastic resin and without being blended with the organic oxidizing component. The bottle was preserved at 55° C. for 28 days to measure the concentration of oxygen dissolved in the container. Further, the oxygen-absorbing layer that has absorbed oxygen was cut out from the multi-layer bottle and was measured for its tensile strength by using the Tensilon. The results were as shown in Tables 3 and 4.

TABLE 3

|  | Moldability of preform | Moldability of bottle | Amount of dissolved $O_2$ (ppb) | Minumum length of dispersant (nm) |
|---|---|---|---|---|
| Ex. 5 | ○ | ○ | 373 | ≦300 |
| Comp. Ex. 7 | ○ | ○ | 2187 | — |

TABLE 4

|  | Preservation temperature (° C.) | Preservation period (days) | $O_2$ absorption (cc/g) | Tensile strength (kgf/mm$^2$) |
|---|---|---|---|---|
| Ex. 5 | 55 | 28 | 0.68 | 8.9 |
| Comp. Ex. 7 | 55 | 28 | 0.34 | 8.9 |

Example 6

By opening a humidity-proof package and by using a T-die extruder (produced by Toshiba Kikai Co.) maintaining the T-die temperature at 270° C., a film having a thickness of 20 μm was formed from a resin composition of a polymetaxylyleneadipamide resin (T-600, AEG=87 eq/10$^6$ g, produced by Toyo Boseki Co.) dried under a pressure of not higher than 1 mmHg and a temperature of 150° C. for 4 hours containing 5% by weight of a maleic acid-modified polybutadiene (M-2000-20 produce by Nihon Sekiyu Kagaku Co.) as an organic oxidizing component and 400 ppm of a cobalt neodecanoate (DICNATE 5000 produced by Dainihon Ink Kagaku Kogyo Co.) as a transition metal catalyst. A multi-layer film was formed by dry-laminating a biaxially stretched polyester film having a thickness of 12 μm on one surface of the film and an unstretched polypropylene film having a thickness of 50 μm on the other surface thereof by using a laminator. The multi-layer film was heat-sealed onto the opening of the above-mentioned HIRE-TOFLEX container. Then, the one boiled at 85° C. for 30 minutes and the one not boiled were preserved under the conditions of 30° C. and 80%RH for 30 days to measure the amount of oxygen permeated into the container.

Example 7

A film was formed under the same conditions as those of Example 6 but using 5% by weight of a hydroxyl group-terminated polyisoprene (Poly ip produced by Idemitsu Sekiyu Kagaku Co.) as an organic oxidizing component and 310 ppm of the above-mentioned cobalt neodecanoate as a transition metal catalyst calculated as cobalt, to measure the amount of oxygen permeated into the container.

Example 8

A film was formed under the same conditions as those of Example 6 but setting the AEG concentration of the polymetaxylyleneadipamide resin to be 52 eq/10$^6$ g, to measure the amount of oxygen permeated into the container.

Example 9

A film was formed under the same conditions as those of Example 6 but using the above-mentioned cobalt neodecanoate as a transition metal catalyst in an amount of 200 ppm calculated as cobalt, to measure the amount of oxygen permeated into the container.

Example 10

A film was formed under the same conditions as those of Example 6 but using the hydroxyl group-terminated polyisoprene as an organic oxidizing component in an amount of 3% by weight, to measure the amount of oxygen permeated into the container.

Example 11

A film was formed under the same conditions as those of Example 6 but using the maleic acid-modified polybutadiene as an organic oxidizing component in an amount of 8% by weight, to measure the amount of oxygen permeated into the container.

Comparative Example 8

A film was formed under the same conditions as those of Example 6 but setting the AEG concentration of the polymetaxylyleneadipamide resin to be 27 eq/$10^6$ g, to measure the amount of oxygen permeated into the container.

Comparative Example 9

A film was formed under the same conditions as those of Example 6 but using the cobalt neodecanoate as a transition metal catalyst in an amount of 80 ppm calculated as cobalt, to measure the amount of oxygen permeated into the container.

Comparative Example 10

A film was formed under the same conditions as those of Example 6 but using the maleic acid-modified polybutadiene as an organic oxidizing component in an amount of 12% by weight.

Table 5 shows the results of the measurement.

TABLE 5

| | Amount of $O_2$ permeation (cc/container) note 5) | | |
|---|---|---|---|
| | No treatment | Boiled | Moldability |
| Ex. 6 | 0 | 0 | good |
| Ex. 7 | 0.15 | 0.15 | good |
| Ex. 8 | 0 | 0 | good |
| Ex. 9 | 0 | 0 | good |
| Ex. 10 | 0.12 | 0.12 | good |
| Ex. 11 | 0 | 0 | good |
| Comp. Ex. 8 | 0.26 | 0.36 | good |
| Comp. Ex. 9 | 0.25 | 0.37 | good |
| Comp. Ex. 10 | — | — | film could not be formed | note 5) Measured in compliance with (1)-② above.

Example 12

A resin composition of a polymetaxylyleneadipamide resin having a amino end group concentration AEG of 87 eq/$10^6$ g containing 5% by weight of a maleic acid-modified polybutadiene and 310 ppm of a cobalt neodecanoate calculated as cobalt, was fed into an extruder for forming an intermediate layer, a polyethylene terephthalate resin was fed into an extruder for forming inner and outer layers, and a maleic acid-modified ethylene-butene-1 copolymer was fed into an extruder for an adhesive, thereby to form a multi-layer sheet at a multi-layer die temperature of 270° C. By using this multi-layer sheet, a cup-like container was obtained relying upon the plug-assisted compressed air molding method, the cup-like container having a layer constitution of 120-μm inner layer/20-μm adhesive layer/20-μm intermediate layer/20-μm adhesive layer/120-μm outer layer, and a height of 150 mm, a mouth diameter of 60 mm and a volume of 300 ml. A closure having an aluminum foil laminated thereon was heat-sealed onto the mouth of the container. After preserved under the conditions of 30° C. and 80%RH for 30 days, the amount of oxygen permeated into the container was measured.

Example 13

A polyethylene terephthalate resin having an inherent viscosity of 0.83 dl/g was fed into an injector for forming inner and outer layers. Pellets obtained by pelletizing, by using a twin-screw extruder, a resin composition of a polymetaxylyleneadipamide resin (T600, AEG=87 eq/$10^6$ g produced by Toyo Boseki Co.) dried under the same conditions as those in Example 1 onto which has been deposited a maleic acid-modified polybutadiene (5 wt %, M-2000-20, produced by Nihon Sekiyu Co.) and a cobalt neodecanoate (DICNATE 5000 produced by Dainihon Ink Kagaku Kogyo Co.) in an amount of 400 ppm calculated as cobalt, was fed to an injector for forming an intermediate layer. The resins were molded by being co-injected into an injection metal mold under the conditions of a temperature of the injection nozzles of 280° C. and a resin pressure of 250 kgf/$cm^2$ to obtain a two-material-three-layer preform having the inner and outer layers of the polyethylene terephthalate resin, and the intermediate layer of the polymetaxylyleneadipamide resin. The multi-layer preform possessed a weight of 32 g, the intermediate layer thereof having a volume ratio of 6%. The multi-layer preform was heated at 110° C., and was biaxially stretched and blown in a metal mold heated at 150° C. to form a multi-layer bottle having a volume of 500 cc. The multi-layer bottle was sealed at the mouth portion, boiled at 85° C. for 30 minutes, and was preserved under the conditions of 30° C. and 80%RH for 60 days to measure the concentration of oxygen in the container.

Example 14

A multi-layer preform was molded under the same conditions as those of Example 13, and was biaxially stretched and blown in a metal mold heated at 60° C. to obtain a multi-layer bottle having a volume of 500 cc. The multi-layer bottle was sealed at its mouth portion and was preserved under the conditions of 30° C. and 80%RH for 60 days to measure the concentration of oxygen in the container.

The results of measurement were as shown in Table 6.

TABLE 6

| | Amount of $O_2$ permeation (cc/container) note 5) | | |
|---|---|---|---|
| | No treatment | Boiled | Moldability |
| Ex. 12 | 0 | — | good |
| Ex. 13 | — | 0 | good |
| Ex. 14 | 0 | — | good |

Example 15

An oxygen-absorbing layer was formed by using melt-kneaded pellets of a poly(m-xylyleneadipamide)(T-600, produced by Toyobo Co.) pelletized by using a twin-screw extruder, 5 wt % of a maleic acid-modified polybutadiene (M-2000-20, produced by Nihon Sekiyu Co.) and 310 ppm (calculated as cobalt) of a cobalt neodecanoate (DICNATE 5000, produced by Dainihon Ink Kagaku Kogyo Co.). A two-material-five-layer preform was obtained having a layer constitution of PET/oxygen-absorbing layer/PET/oxygen-absorbing layer/PET, and was biaxially stretched and blown under same conditions as those in Example 13, at stretching ratios of 2.4 times as great in the longitudinal direction, 2.9 times as great in the transverse direction and 6.96 times as wide in area, to obtain a two-material-five-layer bottle.

Example 16

A two-material-three-layer bottle was formed under the same conditions as those of Example 15 but effecting the biaxial stretch blow-molding at a metal mold temperature of 150° C.

Comparative Example 11

A multi-layer bottle same as that of Example 15 was measured but using melt-kneaded pellets of the poly(m-xylyleneadipamide) pelletized by using the biaxial extruder and 400 ppm (calculated as cobalt) of the cobalt neodecanoate (DICNATE5000, produced by Dainihin Ink Kagaku Kogyo Co.) as the intermediate layer, and effecting the biaxial stretch-blowing at stretching ratios of 2.2 times as great in the longitudinal direction, 2.5 times as great in the transverse direction, 5.5 times as wide in area and at a metal mold temperature of 80° C.

The amounts of heat generated due to the crystallization of the thus formed bottles and half-value widths D½ thereof were as shown in Table 7, and b-values and haze values thereof after preserved for a predetermined period of time were as shown in Table 8.

TABLE 7

| | Position | Amount of heat (J/g) due to crystallization | Half-valued width D1/2 (°) | |
| --- | --- | --- | --- | --- |
| | | | direction of height | circumferential direction |
| Ex. 15 | out | 2.0 | 9.3 | 9.5 |
| | in | 1.4 | 8.9 | 8.9 |
| Comp. Ex. 11 | out | 33.2 | 11.3 | 10.4 |
| | in | 44.1 | 12.6 | 5.6 |

TABLE 8

| | Preserved/ days | Example 15 | Example 16 | Comparative Example 11 |
| --- | --- | --- | --- | --- |
| HAZE (%) | 0 | 1.9 | 2.0 | 4.7 |
| | 14 | 2.1 | 2.0 | 6.6 |
| | 31 | 2.3 | 2.1 | 10.0 |
| | 62 | 2.6 | 2.1 | 17.6 |
| b | 0 | 0.9 | 1.3 | 2.6 |
| | 14 | 0.8 | 1.3 | 3.7 |
| | 31 | 1.0 | 1.3 | 5.1 |
| | 62 | 1.1 | 1.4 | 6.4 |

Example 17

The polyethylene terephthalate (PET) was fed to the injector for forming the inner layer, intermediate layer and outer layer in the co-injection molding machine.

Pellets of an oxygen-absorbing barrier material were fed to an injector for forming the oxygen-absorbing layer, the pellets of the oxygen-absorbing barrier material being obtained by adding a maleic acid-modified polybutadiene (5 wt %, M-2000-20, producee by Nihon Sekiyu Co.) and a cobalt neodecanoate (DICNATE5000, produced by Dainihon Ink Kagaku Kogyo Co.) as a transition metal catalyst in an amount of 400 ppm calculated as cobalt to the poly(m-xylyleneadipamide) resin pellets [6007 (AEG=27 eq/$10^6$ g·pellet value, produced by Mitsubishi Gas Kagaku Co.)] that has been dried.

The resins were co-injected into an injection metal mold under the conditions of an injection nozzle temperature of 280° C. and a resin pressure of 250 kgf/cm² in order to obtain a two-material-five-layer preform having the inner layer, intermediate layer and outer layer which are formed of the PET, and having an oxygen-absorbing layer of the oxygen-absorbing barrier material between the inner layer and the intermediate layer, and between the intermediate layer and the outer layer, and the intermediate layer there of having a 5 wt %.

The preform was, then, heated at 100° C., biaxially stretched and blow-molded into stretching ratios of 2.4 times as great in the longitudinal direction, 2.9 times as great in the transverse direction and 6.96 times as wide in area by using a metal mold maintained at 150° C., and was heat-set for 2.5 seconds to obtain a two-material-five-layer bottle having a volume of 500 ml to evaluate the items shown in Table 9.

Example 18

A two-material-five-layer bottle was molded under the same conditions as those of Example 17 but maintaining the metal mold temperature at 180° C. and effecting the heat-setting for 2.5 seconds, and was evaluated in the same manner as in Example 17.

Example 19

The preform same as that of Example 17 was heated at 100° C., and was biaxially stretched and blow-molded at stretching ratios of 3.3 times as great in the longitudinal direction, 3.5 times as great in the transverse direction and 11.55 times as wide in area by using a primary blow metal mold, in order to obtain a primary blow-molded article of a size larger than a final blow-molded article.

Next, the bottom portion, barrel portion and shoulder portion of the primary blow-molded article were shrunk by being heated in an oven heated at 800° C. for 5 seconds.

In this case, the surface temperature of the molded article was 150° C. in average.

Finally, the primary blow-molded article was biaxially stretched and blow-molded by using a secondary metal mold maintained at 180° C., and was heat-set for 2.5 seconds to obtain a two-material-five-layer bottle to evaluate it.

The multi-layer bottles of Examples 17 to 19 were evaluated to have permitted the permeation of oxygen in small amounts, and to have been shrunk little. The bottles had not been deformed as the parting after the biaxial stretching and blow-molding is excellent.

Comparative Example 12

A two-material-five-layer bottle was molded under the same conditions as those of Example 17 but without effecting the heat-setting in conducting the biaxial stretching and blow-molding in Example 17, and was evaluated.

As a result, it was learned that the amount of oxygen permeation and the shrinking of the container were larger than those of the multi-layer bottles of the above-mentioned Examples.

Comparative Example 13

A two-material-five-layer bottle was molded under the same conditions as those of Example 17 but effecting the heat-setting at a temperature of 130° C. for 2.5 seconds in conducting the biaxial stretch blow-molding in Example 17, and was evaluated.

As a result, like in the above Comparative Example 12, it was learned that the amount of oxygen permeation and the shrinking of the container were larger than those of the multi-layer bottles of the above-mentioned Examples.

Comparative Example 14

A two-material-five-layer bottle was molded under the same conditions as those of Example 17 but effecting the heat-setting at a temperature of 180° C. for 6.0 seconds in conducting the biaxial stretch blow-molding in Example 17, and was evaluated.

As a result, it was learned that the crystallinity became too large in the inner and outer layers, the bottle poorly parted from the metal mold after an increase in the crystallinity, and the deformation was large after having been parted.

Comparative Example 15

A two-material-five-layer bottle was molded under the same conditions as those of Example 19 but effecting the heat-setting at a temperature of 180° C. for 6.0 seconds in conducting the biaxial stretch blow-molding in Example 19, and was evaluated.

As a result, it was learned that the crystallinity became too large in the inner and outer layers, the bottle poorly parted from the metal mold after an increase in the crystallinity, and the deformation was large after having been parted.

In Comparative Examples 14 and 15 above, the crystallinities after having been parted were so high that the amounts of oxygen permeation and the shrinking factors of the containers became obviously equal to, or smaller than, those of the above-mentioned Examples despite they were measured neglecting the deformation of the multi-layer bottles after having been parted. Therefore, the amounts of oxygen permeation and the shrinking factors of the containers were not dared to be measured.

Table 9 shows the crystallinities of the inner and outer layers, loads at the yielding points and the evaluated results of the above-mentioned Examples and Comparative Examples.

Though Table 9 shows none of the crystallinities of the PET layers which are the intermediate layers, amounts of oxygen permeation and the loads at the yielding points thereof in the above-mentioned Examples and Comparative Examples, it should be noted that they assume mean values of the inner and outer PET layers.

TABLE 9

|  | Molding method | Stretch ratio (those of primary blow in the case of 2-step blow) | | | Heat-setting of shaping mold | | Crystallinity (%) | |
|---|---|---|---|---|---|---|---|---|
|  |  | Longi-tude | Trans-verse | Area | Temp. (° C.) | Time (sec) | Inner layer | Outer layer |
| Example 17 | 1-step blow | 2.4 | 2.9 | 6.96 | 150 | 2.5 | 30 | 32 |
| Example 18 | 1-step blow | 2.4 | 2.9 | 6.96 | 180 | 2.5 | 35 | 37 |
| Example 19 | 2-step blow | 3.3 | 3.5 | 11.55 | 180 | 2.5 | 53 | 54 |
| Comp. Ex. 12 | 1-Step blow | 2.4 | 2.9 | 6.96 | none | | 26 | 17 |
| Comp. Ex. 13 | 1-step blow | 2.4 | 2.9 | 6.96 | 130 | 2.5 | 27 | 30 |
| Comp. Ex. 14 | 1-step blow | 2.4 | 2.9 | 6.96 | 180 | 6.0 | 56 | 57 |
| Comp. Ex. 15 | 2-step blow | 3.3 | 3.5 | 11.55 | 180 | 6.0 | 59 | 59 |

|  | Load at yield Point ($\times 10^7$ Pa) | | Evaluation | | | |
|---|---|---|---|---|---|---|
|  |  |  |  | Shrinking | | Deformation |
|  | Inner layer | Outer layer | $O_2$ permeation (cc/month · bottle) | factor (%) | Parting | after parting |
| Example 17 | 9.8 | 10.6 | 0.18 | 1.00 | ○ | no |
| Example 18 | 10.2 | 10.5 | 0.17 | 0.70 | ○ | no |
| Example 19 | 11.6 | 11.9 | 0.10 | 0.05 | ○ | no |
| Comp. Ex. 12 | 8.1 | 8.0 | 0.42 | 9.00 | ○ | no |
| Comp. Ex. 13 | 8.5 | 9.8 | 0.32 | 5.00 | ○ | no |
| Comp. Ex. 14 | — | — | — | — | X | large |
| Comp. Ex. 15 | — | — | — | — | X | large |

Example 20

Pressure-Resistant Container

A two-material-five-layer bottle was molded under the same conditions as those of Example 17 but without effecting the heat-setting, and was evaluated concerning the items shown in Table 10.

Example 21

Heat-Resistant Container

The container obtained according to Example 17 was evaluated concerning the items shown in Table 10.

Example 22

Heat-Resistant Container

The preform same as that of Example 17 was heated at 100° C., and was biaxially stretched and blow-molded at stretching ratios of 3.3 times as great in the longitudinal direction, 3.5 times as great in the transverse direction and 11.55 times as wide in area by using a primary blow metal mold, in order to obtain a primary blow-molded article of a size larger than a final blow-molded article.

Next, the bottom portion, barrel portion and shoulder portion of the primary blow-molded article were shrunk by being heated in an oven heated at 800° C. for 5 seconds.

In this case, the surface temperature of the molded article was 150° C. in average.

Finally, the primary blow-molded article was biaxially stretched and blow-molded by using a secondary metal mold maintained at 180° C., and was heat-set for 2.5 seconds to obtain a two-material-five-layer bottle to evaluate it.

Example 23

Pressure-Resistant Container

A two-material-five-layer bottle was molded in the same manner as in Example 22 but without effecting the heat-setting in conducting the biaxial stretch blow-molding by using the secondary metal mold, and was evaluated.

Comparative Example 16

Pressure-Resistant Container

A multi-layer bottle was molded in the same manner as in Example 20 but effecting the biaxial stretch blow-molding at stretching ratios of 1.8 times as great in the longitudinal direction, 2.2 times as great in the transverse direction and 3.96 times as wide in area.

As a result, the amount of oxygen permeation was large, and a portion under the neck of the multi-layer bottle became thick due to poor stretching.

Comparative Example 17

Heat-Resistant Container

A multi-layer bottle was molded in the same manner as in Example 17 but effecting the biaxial stretch blow-molding at stretching ratios of 1.8 times as great in the longitudinal direction, 2.2 times as great in the transverse direction and 3.96 times as wide in area.

As a result, heat crystallization took place due to the heat-setting, and a thick portion under the neck of the multi-layer bottle became whitened due to the heat though the amount of oxygen permeation has decreased.

Table 10 shows the measured results of half-value widths of peaks of diffraction profiles of the above Examples and Comparative Examples based on the X-ray analysis, as well as the results of evaluation.

TABLE 10

| | Molding method | Stretch ratio (those of primary blow in the case of 2-step blow) | | | Heat-setting of shaping mold | | Half-valued width (°) of peak of diffraction profile by X-ray diffraction Inner layer | |
|---|---|---|---|---|---|---|---|---|
| | | Longi-tude | Trans-verse | Area | Temp. (° C.) | Time (sec) | Circum-ferential direction | Direction of height |
| Example 20 | 1-step blow | 2.4 | 2.9 | 6.96 | none | | 13.1 | 3.3 |
| Example 21 | 1-step blow | 2.4 | 2.9 | 6.96 | 150 | 2.5 | 12.8 | 3.5 |
| Example 22 | 2-step blow | 3.3 | 3.5 | 11.55 | 180 | 2.5 | 3.7 | 9.6 |
| Example 23 | 2-step blow | 3.3 | 3.5 | 11.55 | none | | 3.7 | 9.7 |
| Comp. Ex. 16 | 1-step blow | 1.8 | 2.2 | 3.96 | none | | 9.5 | 14.6 |
| Comp. Ex. 17 | 1-step blow | 1.8 | 2.2 | 3.96 | 150 | 2.5 | 9.5 | 15.1 |

| | Half-valued width (°) of peak of diffraction profile by X-ray diffraction Outer layer | | Evaluation | |
|---|---|---|---|---|
| | Circum-ferential direction | Direction of height | $O_2$ permeation (cc/month · bottle) | Bottle moldability/ appearance |
| Example 20 | 15 | 4.4 | 0.42 | good |
| Example 21 | 14.5 | 4.2 | 0.18 | good |
| Example 22 | 3.9 | 9.8 | 0.08 | good |
| Example 23 | 3.8 | 9.8 | 0.10 | good |
| Comp. Ex. 16 | 15.3 | 15.3 | 0.66 | portion under neck becomes thick due to low stretch |
| Comp. Ex. 17 | 15.4 | 15.2 | 0.17 | thick portion under neck is whitened |

What is claimed is:

1. A packaging material having an oxygen-absorbing layer of a thermoplastic resin which is blended with an organic oxidizing component and with a transition metal catalyst, wherein said thermoplastic resin is a xylylene group-containing polyamide resin having an amino end group concentration of not smaller than 40 eq/$10^6$ g and not substantially oxidized in the presence of the transition metal catalyst.

2. A packaging material according to claim 1, wherein said organic oxidizing component is a polyene.

3. A packaging material according to claim 1, wherein said organic oxidizing component is a polyene having a functional group on a side chain or at a terminal thereof.

4. A packaging material according to claim 1, wherein said organic oxidizing component is a polybutadiene modified with maleic acid, a polybutadiene modified with maleic anhydride, a polyisoprene modified with maleic acid or a polyisoprene modified with maleic anhydride.

5. A packaging material according to claim 1, wherein said organic oxidizing component is dispersed in the thermoplastic resin, and the dispersant has a minimum length of not larger than 400 nm, the minimum length being a length of a portion where the gap becomes the smallest across two parallel lines between which the dispersant is held in a contacting manner.

6. A packaging material according to claim 1, wherein said transition metal catalyst is an organic salt of cobalt and is contained at a concentration of not smaller than 300 ppm calculated as a metal.

7. A packaging material according to claim 1, wherein said packaging material is a multi-layer container having at least one oxygen-absorbing layer.

8. A multi-layer container according to claim 7, wherein the thermoplastic resin in said oxygen-absorbing layer is a xylylene group-containing polyamide resin having a amino end group concentration of not smaller than 40 eq/$10^6$ g.

9. A multi-layer container according to claim 8, wherein an exothermic peak of the oxygen-absorbing layer resin due to the crystallization is not larger than 10 J/g as measured by the DSC, and a half-value width of a maximum value of a diffraction profile at 2 $\theta$=0 to 100° is not larger than 10° as measured relying upon the x-ray diffraction.

10. A multi-layer container according to claim 7, wherein a layer of a thermoplastic polyester resin is provided on at least the one side of the oxygen-absorbing layer.

11. A multi-layer container according to claim 10, wherein a half-value width of an X-ray diffraction profile of said polyester resin layer is not larger than 15°.

12. A multi-layer container according to claim 10, wherein said thermoplastic polyester resin has a crystallinity of from 30 to 55%.

* * * * *